US009694688B2

(12) United States Patent
Oyama et al.

(10) Patent No.: US 9,694,688 B2
(45) Date of Patent: Jul. 4, 2017

(54) ELECTRIC VEHICLE DRIVE SYSTEM

(71) Applicant: Hitachi Automotive Systems, Ltd., Hitachinaka-shi, Ibaraki (JP)

(72) Inventors: Kazuto Oyama, Hitachinaka (JP); Hideki Miyazaki, Hitachinaka (JP); Katsuhiro Hoshino, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 96 days.

(21) Appl. No.: 14/421,647

(22) PCT Filed: Jul. 24, 2013

(86) PCT No.: PCT/JP2013/069970
§ 371 (c)(1),
(2) Date: Feb. 13, 2015

(87) PCT Pub. No.: WO2014/034333
PCT Pub. Date: Mar. 16, 2014

(65) Prior Publication Data
US 2015/0202966 A1 Jul. 23, 2015

(30) Foreign Application Priority Data

Aug. 30, 2012 (JP) ................................ 2012-190345

(51) Int. Cl.
*B60L 7/00* (2006.01)
*B60L 7/10* (2006.01)
(Continued)

(52) U.S. Cl.
CPC .............. *B60L 7/26* (2013.01); *B60L 3/0046* (2013.01); *B60L 3/0076* (2013.01); *B60L 7/14* (2013.01);
(Continued)

(58) Field of Classification Search
CPC combination set(s) only.
See application file for complete search history.

(56) References Cited

U.S. PATENT DOCUMENTS 5,798,629 A * 8/1998 Terauchi ............ G01R 31/3648
320/106
5,998,884 A * 12/1999 Kitamine ............ B60L 11/1851
180/65.8
(Continued)

FOREIGN PATENT DOCUMENTS

DE 10 2005 058 829 A1 6/2007
JP 11-215610 A 8/1999
(Continued)

OTHER PUBLICATIONS

International Search Report (PCT/ISA/210) dated Nov. 5, 2013, with English translation (Five (5) pages).
(Continued)

*Primary Examiner* — Yonel Beaulieu
(74) *Attorney, Agent, or Firm* — Crowell & Moring LLP

(57) ABSTRACT

In order to provide an electric vehicle drive system capable of promoting improvement in stability of vehicle traveling when stopping a regeneration operation during operation of a regeneration cooperative brake, the electric vehicle drive system, a battery control unit 310, upon detecting that a battery state is an unchargeable state during control of the regeneration cooperative brake, diagnoses whether a battery 300 is chargeable, and upon deciding to be unchargeable from a result of diagnosis, outputs a Fail signal. Then, a rotating electrical machine control unit 210, upon receiving a Fail prediction signal while the regeneration cooperative brake is being controlled, executes loss increase control for increasing an internal loss of a rotating electrical machine 900 and reducing regenerative electric power by a regen-
(Continued)

erative brake while maintaining torque of the rotating electrical machine 900 at regenerative torque corresponding to regenerative brake force.

6 Claims, 26 Drawing Sheets

(51) Int. Cl.
  *B60L 15/20* (2006.01)
  *B60L 3/00* (2006.01)
  *B60L 7/26* (2006.01)
  *B60L 7/14* (2006.01)
  *B60L 11/18* (2006.01)
  *H02P 27/08* (2006.01)
  *H02P 21/36* (2016.01)

(52) U.S. Cl.
  CPC ....... *B60L 11/1861* (2013.01); *B60L 15/2009* (2013.01); *H02P 21/36* (2016.02); *H02P 27/08* (2013.01); *B60L 2240/421* (2013.01); *B60L 2240/423* (2013.01); *B60L 2240/429* (2013.01); *Y02T 10/643* (2013.01); *Y02T 10/7005* (2013.01); *Y02T 10/705* (2013.01); *Y02T 10/7044* (2013.01); *Y02T 10/7258* (2013.01)

(56) References Cited

U.S. PATENT DOCUMENTS

| | | | | |
|---|---|---|---|---|
| 6,081,098 A * | 6/2000 | Bertness | ............... | H02J 7/0077 320/134 |
| 8,042,633 B2 * | 10/2011 | Nakanishi | ............... | B60L 11/14 180/65.29 |
| 8,111,036 B2 * | 2/2012 | Rosenstock | ........... | H02J 7/1415 307/10.1 |
| 8,682,517 B2 * | 3/2014 | Iida | ..................... | B60L 11/1816 180/65.8 |
| 9,300,148 B2 * | 3/2016 | Oh | ......................... | H02J 7/0022 |
| 2001/0041952 A1 * | 11/2001 | Nada | ..................... | B60K 6/445 701/22 |
| 2012/0056470 A1 | 3/2012 | Kim | | |
| 2014/0225620 A1 * | 8/2014 | Campbell | .......... | B60L 11/1838 324/426 |
| 2014/0229129 A1 * | 8/2014 | Campbell | .......... | G01R 31/3606 702/63 |
| 2014/0379209 A1 * | 12/2014 | Matsuda | ................ | B60L 15/20 701/34.2 |

FOREIGN PATENT DOCUMENTS

| | | |
|---|---|---|
| JP | 2000-152409 A | 5/2000 |
| JP | 2003-134602 A | 5/2003 |
| JP | 2005-329740 A | 12/2005 |
| JP | 2011-97666 A | 5/2011 |
| JP | 2012-60871 A | 3/2012 |

OTHER PUBLICATIONS

Partial English Translation of German-language Office Action issued in counterpart German Application No. 112013004242.8 dated Jun. 29, 2016 (2 pages).

\* cited by examiner

PHASE CURRENT  a<b<c<d<e<f<g<h<i<j

PHASE CURRENT  a<b<c<d<e<f<g<h<i<j

ELECTRIC VEHICLE DRIVE SYSTEM

TECHNICAL FIELD

The present invention relates to an electric vehicle drive system to be loaded on an electrically driven vehicle that performs regeneration cooperative brake control.

BACKGROUND ART

In an electric motor car such as a hybrid vehicle, an electric vehicle and so forth adapted to drive wheels by utilizing driving force of a rotating electrical machine, when a vehicle speed is to be controlled and the vehicle is to be braked, the rotating electrical machine is regeneratively operated to generate braking force and regenerative electric power generated at that time is returned to a battery to charge it therewith, thereby effectively making use of vehicle kinetic energy. Incidentally, in the following, a motor, a generator and a motor generator will be generally referred to as the rotating electrical machine.

That is, although in a conventional vehicle, the kinetic energy of the vehicle has been converted into frictional heat by a friction brake and discarded under braking, in an electric motor car provided with regeneration cooperative brake equipment, driver requested braking force is apportioned to frictional brake force and regenerative brake force, and part of the kinetic energy of the vehicle is recovered as regenerative electric power to charge the battery with it. However, since the part of the braking force is apportioned to the regenerative brake force of the rotating electrical machine, in a case where a battery fail occurs and charging and discharging have been inhibited while the regeneration cooperative brake is being operated, if a regeneration operation of the rotating electrical machine is immediately stopped, the braking force will become insufficient and traveling of the vehicle will become unstable and a feeling of anxiety will be given to the driver.

For example, as control in a case where electric power acceptance to the battery is restricted, a technique that power generation efficiency is lowered by changing the phase of currents so as to lower a power generation amount without changing the torque of the rotating electrical machine is known (for example, Patent Literature 1).

CITATION LIST

Patent Literature

Patent Literature 1: Japanese Unexamined Patent Application Publication No. 2000-152409

SUMMARY OF INVENTION

Technical Problem

However, in the description in Patent Literature 1, there is not shown a favorable method in regard to the problem of instability of vehicle traveling incidental to stopping of the regeneration operation while the regeneration cooperative brake is being operated.

Solution to Problem

The invention according to claim 1 is an electric vehicle drive system, including a battery monitoring unit that is loaded on an electrically driven vehicle provided with a regeneration cooperative brake control device and monitors the state of a battery loaded on the electrically driven vehicle and a rotating electrical machine control unit that controls a rotating electrical, machine of the electrically driven vehicle, wherein the battery monitoring unit, upon detecting that the battery state is an unchargeable state during control of a regeneration cooperative brake, diagnoses whether the battery is chargeable, and upon deciding to be unchargeable from a result of diagnosis, outputs an unchargeable signal, and the rotating electrical machine control unit, upon receiving the unchargeable signal during control of the regeneration cooperative brake, executes loss increase control for increasing an internal loss of the rotating electrical machine and reducing regenerative electric power by a regenerative brake, while maintaining torque of the rotating electrical machine at regenerative toque corresponding to force of the aforementioned regenerative brake.

Advantageous Effects of Invention

According to the present invention, improvement in stability of vehicle traveling can be promoted when stopping a regeneration operation during operation of the regenerative cooperative brake, by performing the loss increase control for reducing the generative electric power during operation of the regeneration cooperative brake.

DESCRIPTION OF EMBODIMENTS

In the following, modes for embodying the present invention will be described with reference to the drawings.

First Embodiment

Figure 1:
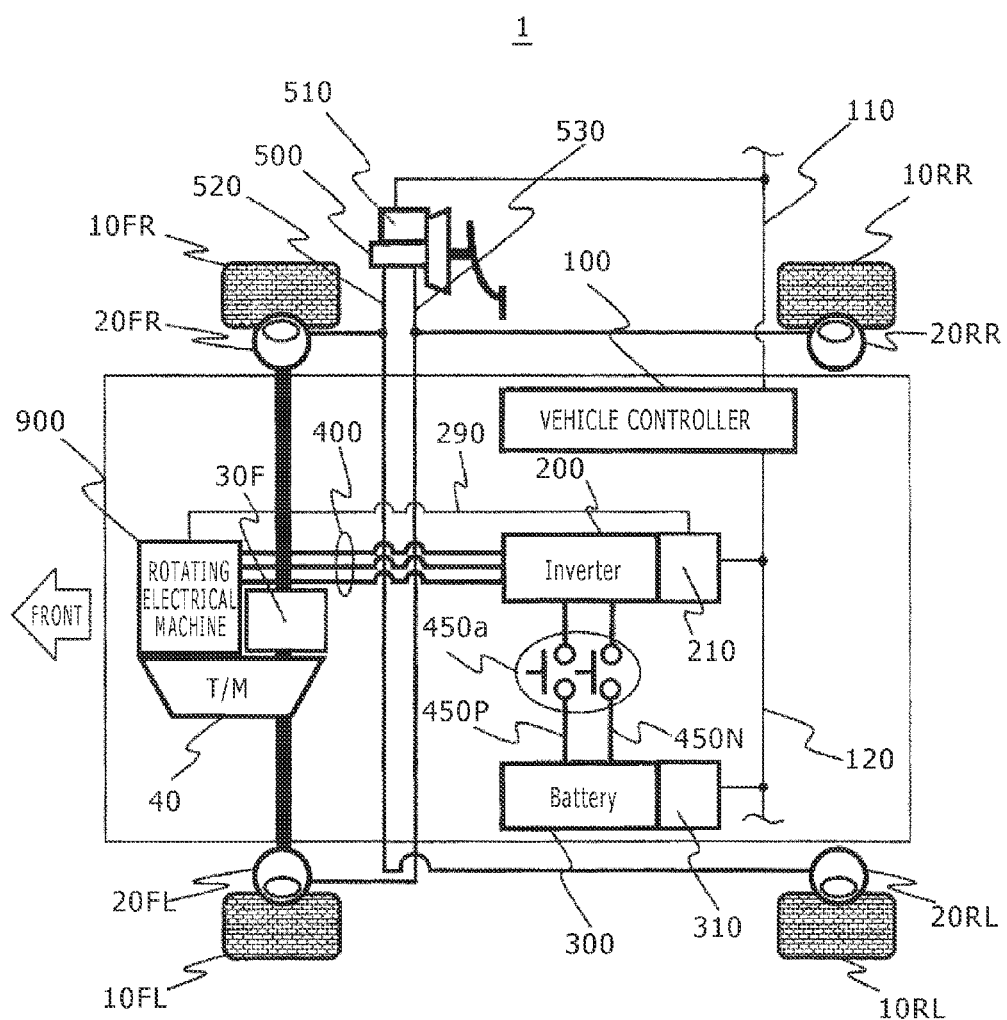
FIG. 1 is a diagram showing a configuration of an electric motor car 1 to which an electric vehicle drive system has been applied.

FIG. 1 is a diagram showing a configuration of the electric motor car 1 to which an electric vehicle drive system of the present embodiment has been applied. Incidentally, although as an example of the electric motor car 1 shown in FIG. 1, an electric vehicle (hereinafter, described as the "EV") is shown, it can be similarly applied to electric motor cars such as a hybrid vehicle (hereinafter, described as the "HEV") and so forth.

A rotating electrical machine 900 generates torque for traveling of a vehicle. In addition, the rotating electrical machine 900 has not only a function of generating rotating torque but also a function (a regeneration function) of converting the traveling kinetic energy into electric power when the traveling kinetic energy of the vehicle has been added as the rotating torque of a wheel 10, conversely. The rotating electrical machine 900 is, for example, an AC synchronous machine or an AC induction machine and is provided with a stator and a rotor (not shown), and the stator is provided with stator coils for three phases of, for example, a U-phase, a V-phase and a W-phase. The rotating electrical machine 900 operates as a motor and a generator depending on the driving method as mentioned above.

In a case where the rotating electrical machine 900 is to be loaded on a vehicle, it is desirable to obtain a high output by the small-sized one and a permanent magnet type synchronous motor that uses a magnet such as neodymium and so forth in the rotor (not shown) is suitable. In addition, the permanent magnet type synchronous motor is reduced in heat generation from the rotor in comparison with an induction motor and is excellent to be used for vehicle also from this viewpoint. In the present embodiment, the rotating electrical machine 900 will be described as a permanent magnet type three-phase AC synchronous motor.

The electric motor car 1 is provided with left and right front wheels 10FR and 10FL and left and right rear wheels 10RR and 10RL output torque of the rotating electrical machine 900 is transmitted to the left and right front wheels 10FR and 10FL via a transmission 40 and a differential gear 30F. Although in the present embodiment, the electric motor car 1 has been described by giving a front-wheel drive EV as an example, rear-wheel drive and four-wheel drive EVs and HEV's may be allowed.

On the other hand, when operating a regenerative brake, rotation torque is transmitted from the wheels to the rotating electrical machine 900, and the rotating electrical machine 900 generates AC power (regenerative electric power) on the basis of she rotating torque supplied thereto. The generated. AC power is converted into DC power by the power converter 200 as later described, and is used for charging the battery 300. The charged power is used again as the traveling energy. Incidentally, signals of a rotation sensor 920 and a temperature sensor 930 provided on the rotating electrical machine 900 have been fetched into the rotating electrical machine control unit 210 of the power converter 200 via a signal line 290.

The power converter 200 is an inverter provided with the rotating electrical machine control unit 210. When the rotating electrical machine 900 is to be powered, the power converter 200 converts the DC power from the battery 300 into the AC power and supplies it to the rotating electrical machine 900. When the rotating electrical machine is to be regeneratively operated, the power converter 200 converts the AC power (the regenerative electric power) generated by she rotating electrical machine 900 into the DC power and charges the battery 300 with it. The rotating electrical machine 900 and the power converter 200 are connected together by AC harnesses 400 (for three phases of the U-phase, the V-phase and the W-phase). The power converter 200 and the battery 300 are connected together by DC harnesses 450P and 450N. The electric power can be supplied and received bi-directionally from the rotating electrical machine 900 to the battery 300 or from the battery 300 to the rotating electrical machine 900 via the power converter 200.

The battery 300 is configured by, for example, a NiMH (nickel metal hydride) battery, a Li-ion (lithium-ion) battery and so forth and is provided with the battery control unit 310. Details of a configuration of the battery 300 will be described later. A relay 450a is provided on the DC harnesses 450P and 450N that connect together the power converter 200 and the battery 300, and the power converter and the battery 300 can be mechanically connected together and disconnected from each other via this relay 450a.

Regeneration cooperative brake equipment 500 is provided with a brake control unit 510. The regeneration cooperative brake equipment 500 arithmetically operates braking force that a driver requests on the basis of a stepping amount of a brake pedal and transmits it to a vehicle controller 100. In addition, it generates the braking force according to a command from the vehicle controller 100. During regeneration cooperative braking, it generates the braking force of the amount that regenerative brake force has been subtracted from the total braking force that the driver requests. Details relevant to an operation of the regeneration cooperative brake will be described later. The regeneration cooperative brake equipment 500 is connected with a front-wheel right-side caliper 20FR and a rear-wheel left-side caliper 20RL via brake hydraulic piping 520 and is connected with the front-wheel left-side caliper 20FR and the rear-wheel right-side caliper 20RL via brake hydraulic piping 530. The braking force is transmitted to the wheels 10FR, 10FL, 10RR and 10RL by the brake hydraulic pressure.

The vehicle controller 100 is the highest-rank control, device that manages the vehicle in an integrated manner. The vehicle controller 100 and the brake control unit 510 are connected together over a first CAN 110, and the vehicle controller 100, the rotating electrical machine control unit 210 and the battery control unit 310 are connected together over a second CAN 120 so as to communicate with one another over the CANs.

Figure 2:
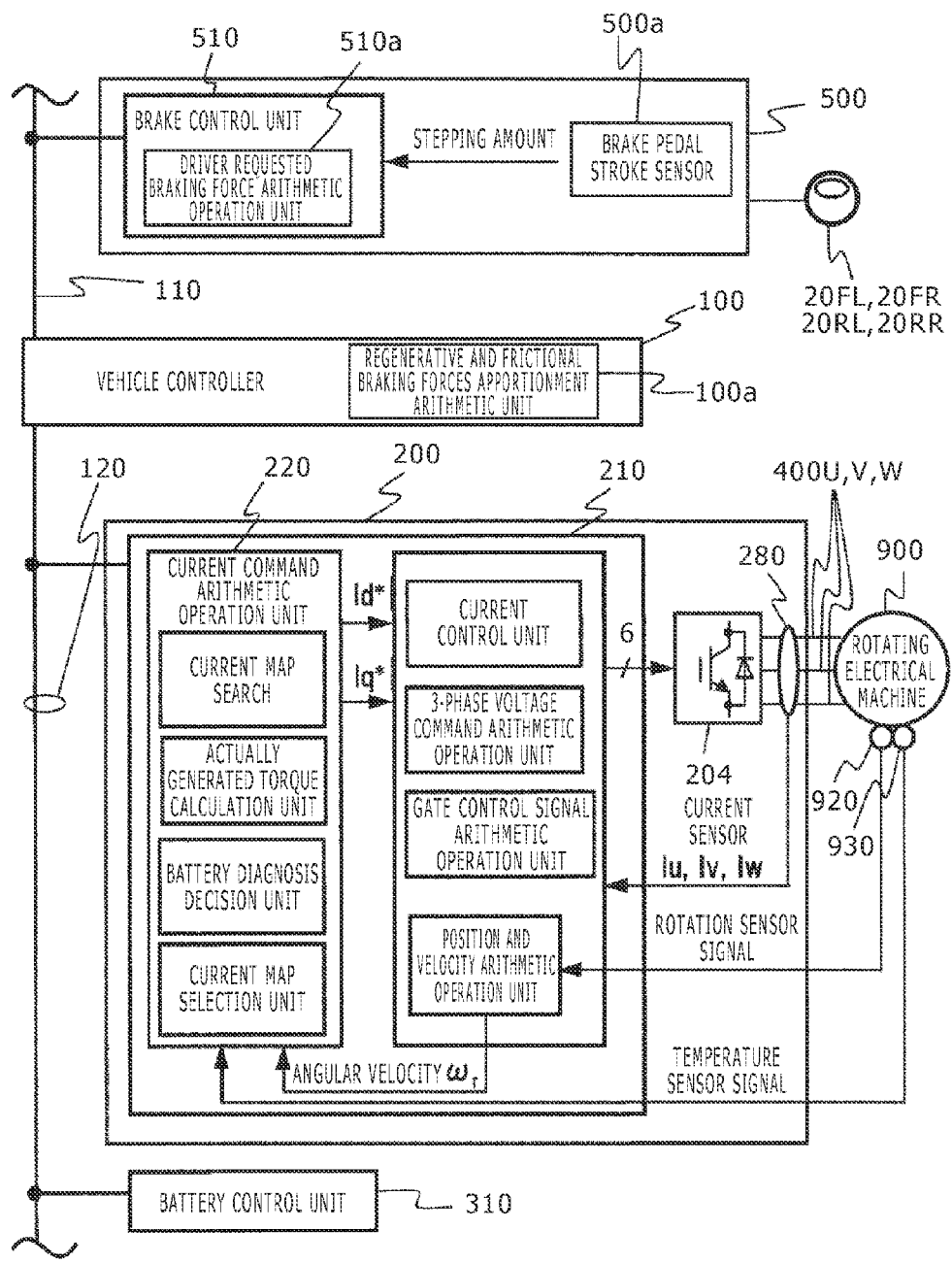
FIG. 2 is a block diagram showing essential parts of the electric motor car 1.

Next, a control block configuration of the electric motor car 1 of the embodiment of the present invention will be described. FIG. 2 is a block diagram showing essential parts of the electric motor car 1 and shows the vehicle controller 100, the power converter 200, the battery control device 310, the regeneration cooperative brake equipment 500 and the rotating electrical machine 900. When the driver steps on an accelerator (not shown) or steps on the brake, the vehicle controller 100 transmits a torque command T* for powering or regeneration to the rotating electrical machine control unit 210 with reference to a battery information (SOC and the total voltage) signal and so forth that have been acquired from the battery control unit 310 over the second CAN 120 in order to control the electric motor car 1.

A brake pedal stroke sensor 500a that detects the brake stepping amount when the driver has stepped on the brake is provided on the regeneration cooperative brake equipment 500. A driver requested braking force arithmetic operation unit 510a that arithmetically operates the braking force that the driver requires on the basis of a result of detection by the brake pedal stroke sensor 500a is provided on the brake control unit 510 of the regeneration cooperative brake equipment 500. The arithmetically operated driver requested braking force is transmitted to the vehicle controller 100 over the first CAN 110.

A regenerative and frictional braking forces distribution arithmetic unit 100a is provided on the vehicle controller 100. When operating the regeneration cooperative brake, part of the driver requested braking force is apportioned to the regenerative brake force. The regenerative and frictional braking forces distribution arithmetic unit 100a arithmetically operates such an apportionment amount that traveling stability of the electric motor car 1 is assured and a feeling of strangeness of brake switching is not given to the driver on the basis of the received driver requested braking force. The vehicle controller 100 transmits a command for the braking force shared to the frictional brake to the brake control unit 510 over the first CAN 110. In addition, a command relevant to the apportioned regenerative brake force is transmitted to the rotating electrical machine control unit 210 over the second CAN 120 as the torque command T*. Incidentally, the vehicle controller 100 transmits the torque command T* for driving the rotating electrical machine 900 to the rotating electrical machine control unit 210 regardless of powering and regeneration.

Figure 3:
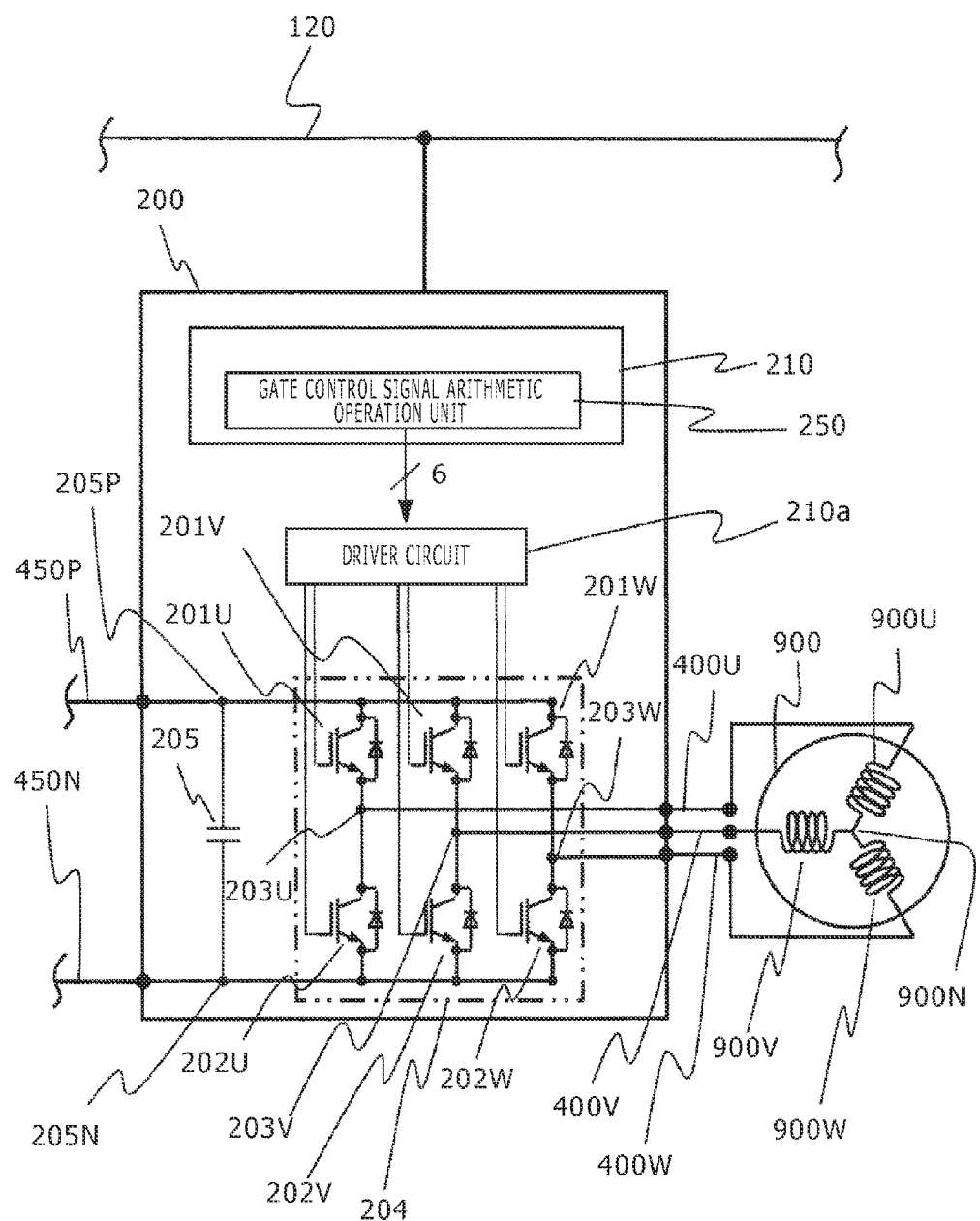
FIG. 3 is a diagram showing a configuration of a power converter 200.

FIG. 3 is a diagram showing a configuration of the power converter 200. The power converter 200 is provided with an inverter circuit 204, the rotating electrical machine control unit 210, a driver circuit 210a, a smoothing capacitor 205 and a current sensor 280. When the rotating electrical machine 900 is to be powered, the DC power from the battery 300 is sent from the battery 300 to a positive electrode side 205P and a negative electrode side 205N of the smoothing capacitor 205 through the DC harnesses 450P and 450N and is supplied to the inverter circuit 204. The DC power is converted into the AC power by the inverter circuit 204 and is supplied to the rotating electrical machine 900.

On the other hand, when the rotating electrical machine 900 is to be regenerated, the AC power is generated by rotating the rotating electrical machine 900 with the rotating torque from the wheels, and that AC power is converted into the DC power by the inverter circuit 204. The converted DC power is supplied from the positive electrode side 205P and the negative electrode side 205N of the smoothing capacitor 205 to the battery 300 via the DC harnesses 450P and 450N and the battery 300 is charged with it.

As shown in FIG. 3, the inverter circuit 204 that converts the DC power into the AC power is provided with six switching elements 201U, 202U, 201V, 202V, 201W and 202W. For the switching elements, IGBTs, MOSFETs and so forth are used. An emitter electrode of the switching element 201U and a collector electrode of the switching element 202U, an emitter electrode of the switching element 201V and a collector electrode of the switching element 202V and an emitter electrode of the switching element 201W and a collector electrode of the switching element 202W are respectively connected together electrically. The collector electrodes of the switching elements 201U, 201V and 201W are electrically connected with the positive electrode side of the battery 300 via the DC harness 450P. The emitter electrodes of the switching elements 202U, 202V and 202W are electrically connected with the negative electrode side of the battery 300 via the DC harness 450N.

A connection point 203U between the series-connected switching elements 201U and 202U is connected to one end of a U-phase coil 900U of the rotating electrical machine 900. Likewise, a connection point 203V between the switching elements 201V and 202V is connected to one end of a V-phase coil 900V of the rotating electrical machine 900, and a connection point 203W between the switching elements 201W and 202W is connected to one end of a N-phase coil 900W of the rotating electrical machine 900. The other ends of the U-phase coil 900U, the V-phase coil 900V and the N-phase coil 900W are connected together at a neutral point. 900V. The driver circuit 210a generates a drive signal for conducting or cutting off the switching elements 201U, 201V and 201W and the switching elements 202U, 202V and 202W on the basis of a gate control signal output from a gate control signal arithmetic operation unit 250 of the rotating electrical machine control unit 210.

The current sensor 280 shown in FIG. 2 detects 3C currents of three phases Iu, Iv and Iw that flow through the U-phase coil 900U, the V-phase coil 900V and W-phase coil 900W of the rotating electrical machine 900. The detected current values Iu, Iv and Iw are input into the rotating electrical machine control unit 210. The rotating electrical machine 900 is provided with the rotation sensor 920 and the temperature sensor 930. A rotation sensor signal output from the rotation sensor 920 is input into a position and velocity arithmetic unit. 260 of the rotating electrical, machine control unit 210. In addition, the temperature sensor 930 detects a coil temperature of at least one of the U-phase coil 900U, the V-phase coil 900V and the W-phase coil 900W provided on the stator (not shown) of the rotating electrical machine 900. The detected coil temperature (a temperature sensor signal) is input into the current command arithmetic operation unit 220 of the rotating electrical machine control unit 210.

Figure 4:
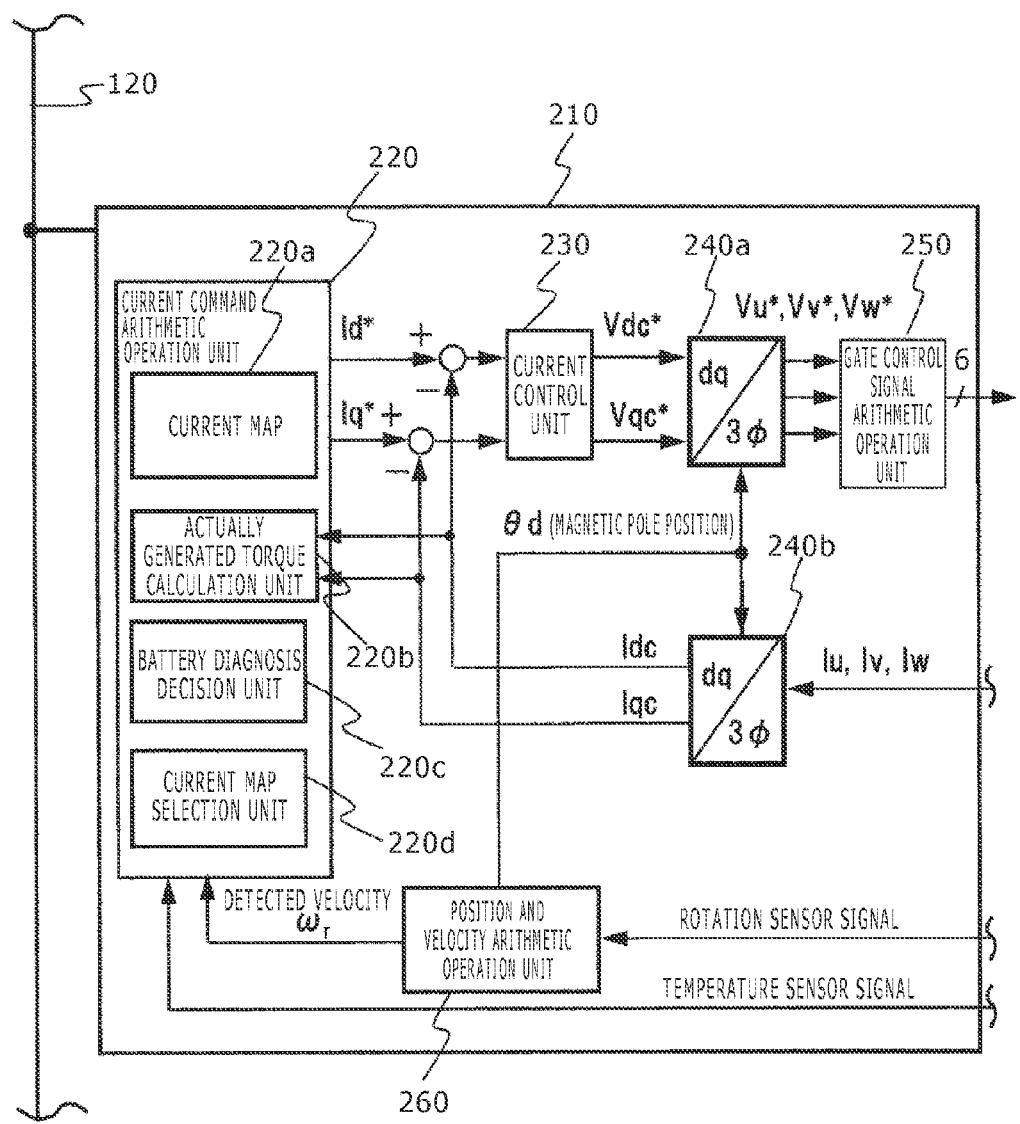
FIG. 4 is a diagram showing a rotating electrical machine control unit 210.

FIG. 4 is a diagram showing the rotating electrical machine control unit 210. The rotating electrical machine control unit 210 is provided with the current command arithmetic operation unit 220, a current control unit 230, a two-phase-three-phase converter 240a, a three-phase-twophase converter 240b, the gate control signal arithmetic unit 250 and the position on and velocity arithmetic unit 260. In addition, the current command arithmetic operation unit. 220 is provided with the current map 220a, an actually generated torque calculation unit 220b, a battery diagnosis decision unit 220c and a current map selection unit 220d.

The position and velocity arithmetic unit 260 calculates a magnetic pole position θd and an angular velocity ωr of the rotor (not shown) of the rotating electrical machine 900 on the basis of the rotation sensor signal input from the rotation sensor 920. The magnetic pole position Pd is input into the two-phase-three-phase converter 240a that converts from a d-q axis (two-phase) system into a UVW (three-phase) system and the three-phase-two-phase converter 240b that converts from the UVW (three-phase) system into the d-q axis (two-phase) system respectively to be used in a conversion calculation in each of them. In addition, the calculated angular velocity ωr is input into the current command arithmetic operation unit 220.

In the three-phase-two-phase converter 240b, the current values Iu, Iv and Iw input from the current sensor 280 are converted into d- and q-axis currents Idc and Iqc on the basis of the magnetic pole position θd input, from the position and velocity arithmetic unit 260. The converted d- and q-axis currents Idc and Iqc are fed back (negative feedback) to a d-axis current command Id* and a q-axis current command Iq* that are the ones before input into the current control unit 230. In addition, the d- and q-axis currents Idc and Iqc are also input, into the actually generated torque calculation unit 220h. The actually generated torque calculation unit 220b arithmetically operates actually generated torque Ta from the currents Idc and Iqc that actually flow through the rotating electrical machine 900. The calculated actually generated torque Ta is transmitted to the vehicle controller 100 over the second CAN 120.

The current command arithmetic operation unit 220 of the rotating electrical machine control unit 210 searches the d-axis current command Id* and the q-axis current command Iq* to be given to the rotating electrical machine 900 from the current map 220a on the basis of the magnetic pole position θd input from the position and velocity arithmetic unit 260 and the torque command T* input from the vehicle controller 100. The current map 220a is the one that the d-axis current command Id* and the q-axis current command Iq* that are required for every operating point of the rotating electrical machine 900 that is determined from the angular velocity ωr and the torque command T* have been mapped in advance. Incidentally, the current command arithmetic operation unit 220 restricts the output from the rotating electrical machine 900 when powered or regenerated, between 0 and 100% for the torque command T* from the vehicle controller 100 in accordance with the coil temperature input from the temperature sensor 930.

Figure 5:
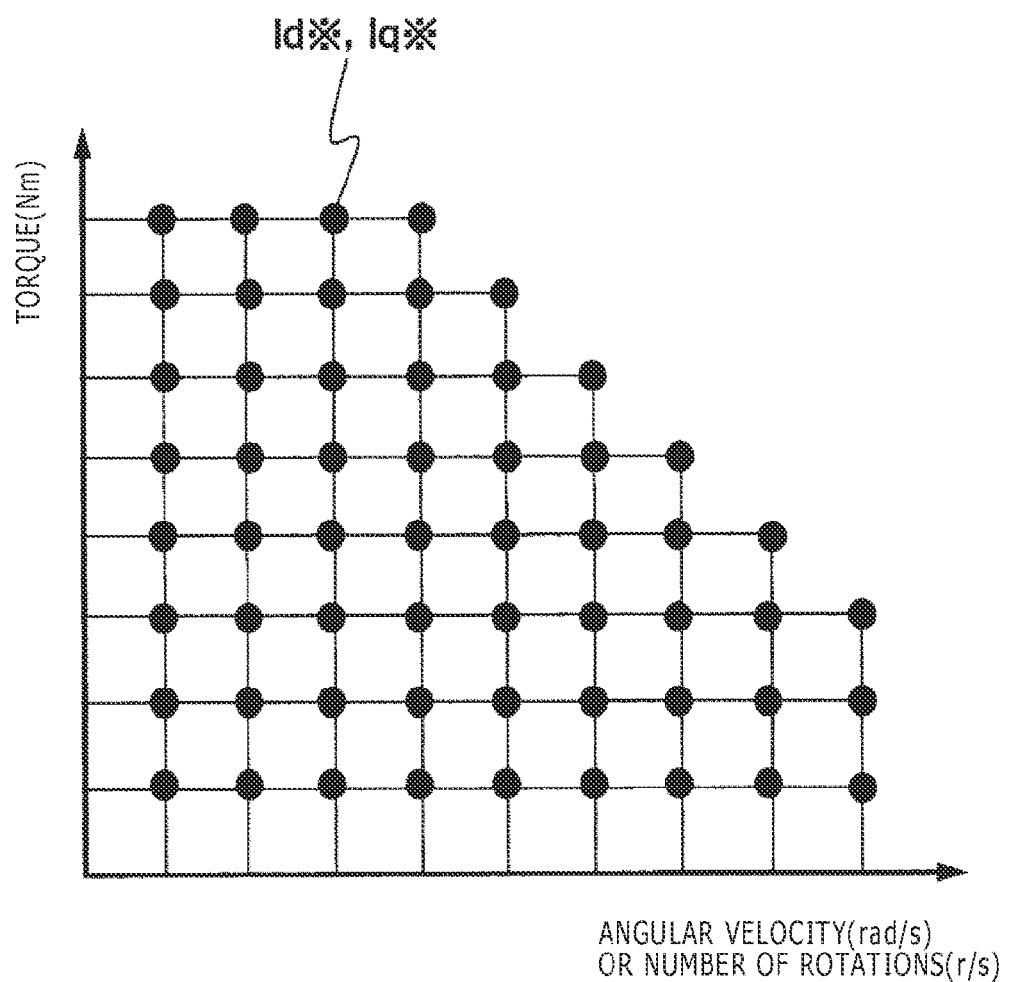
FIG. 5 is a diagram showing one example of a current map.

FIG. 5 is a diagram showing one example of the current map. The horizontal axis is the angular velocity ωr (or a number of rotations) and the vertical axis is the torque command value T*. The respective operating points are divided like a grid and the d-axis current command Id* and the q-axis current command Iq* that are required in order to get the torque command value T* at the angular velocity ωr are stored into each operating point. Incidentally, data between the respective operating points is calculated by making use of linear interpolation and so forth.

The d-axis current command Id* and the q-axis current command Iq* that have been searched from the current map 220a in the current command arithmetic operation unit 220 are input into the current control unit 230 after the d- and q-axis currents Idc and Idc have been fed-back (negative feedback) as described above. The current control unit 230 converts the input d- and q-axis current commands into voltage command values (a d-axis voltage command Vdc* and a q-axis voltage command Vqc*) and outputs them to the two-phase-three phase converter 240a. The two-phase-three-phase converter 240a converts the d-axis voltage command Vdc* and the q-axis voltage command Vqc* into voltage commands of three phases Vu*, Vv* and Vw* on the basis of the magnetic pole position θd. The gate control signal arithmetic operation unit 250 generates the control signal for conducting or cutting off the switching elements provided on the inverter circuit 204 on the basis of the voltage commands of three phases Vu*, Vv* and Vw*.

(Description of Regeneration Cooperative Brake)

Figure 6:
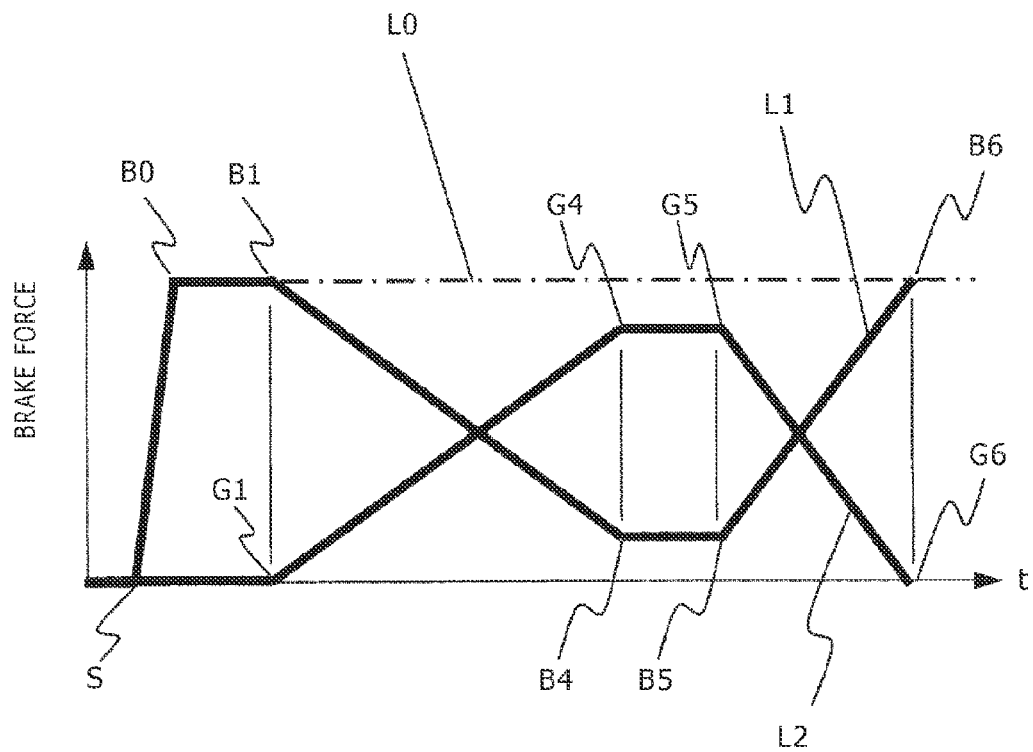
FIG. 6 is a diagram showing a change in apportioned state of a frictional, brake and a regenerative brake during operation of a regeneration cooperative brake.

Next, control of the regeneration cooperative brake in normal operation, that is, in a case of where there is a margin that is enough to accept charging of the battery 300 for regenerative charging will be described. In the regeneration cooperative brake control, in normal operation, the control that is the same as the conventional one is performed also in the present embodiment. As described before, during regeneration cooperative braking, the braking force that the driver requests is apportioned to the frictional brake and the regenerative brake. FIG. 6 is a diagram showing a change in apportioned state of the frictional brake and the regenerative brake while the regeneration cooperative brake is being operated. In FIG. 6, the vertical axis shows the brake force of the frictional brake and the regenerative brake and the horizontal axis shows a time. A line L1 shows the brake force of the frictional brake and a line L2 shows the brake force of the regenerative brake. In addition, a line L0 shown by a one-point chained line shows the driver requested braking force. Points B1 to B6 on the line L1 and corresponding points G1 to G6 on the line L2 respectively show points at the same time.

Figure 7:
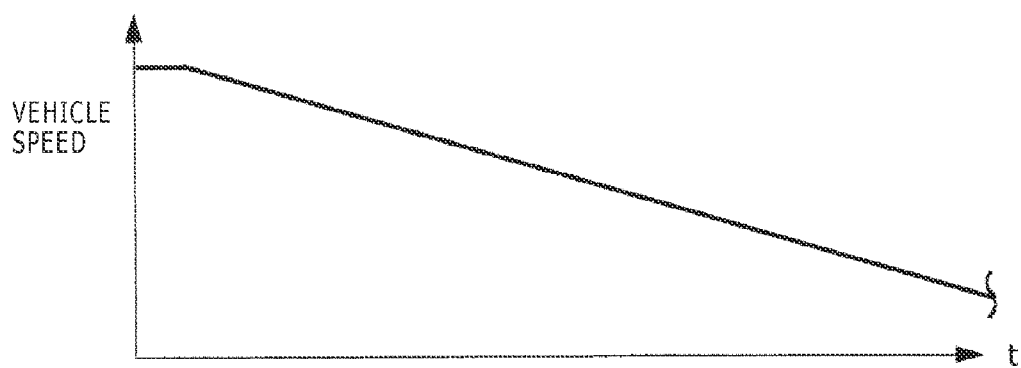
FIG. 7 is a diagram showing a speed of the electric motor car 1 during operation of the regeneration cooperative brake.

In addition, FIG. 7 is a diagram showing a speed of the electric motor car 1 during operation of the regeneration cooperative brake shown in FIG. 6. Incidentally, in the following, a case where the driver is stepping on the brake pedal with constant force, that is, a case where the requested braking force is constant as shown by the line L0 in FIG. 6 will be described by way of example.

When the driver steps on the brake at a point S in FIG. 6, the regeneration cooperative brake equipment 500 raises the frictional brake force up to a point B0 in accordance with the brake stepping amount to assure, first, the driver requested braking force. Up to a point B1 (G1), the driver requested braking force is assured only with the frictional brake force.

Figure 8:
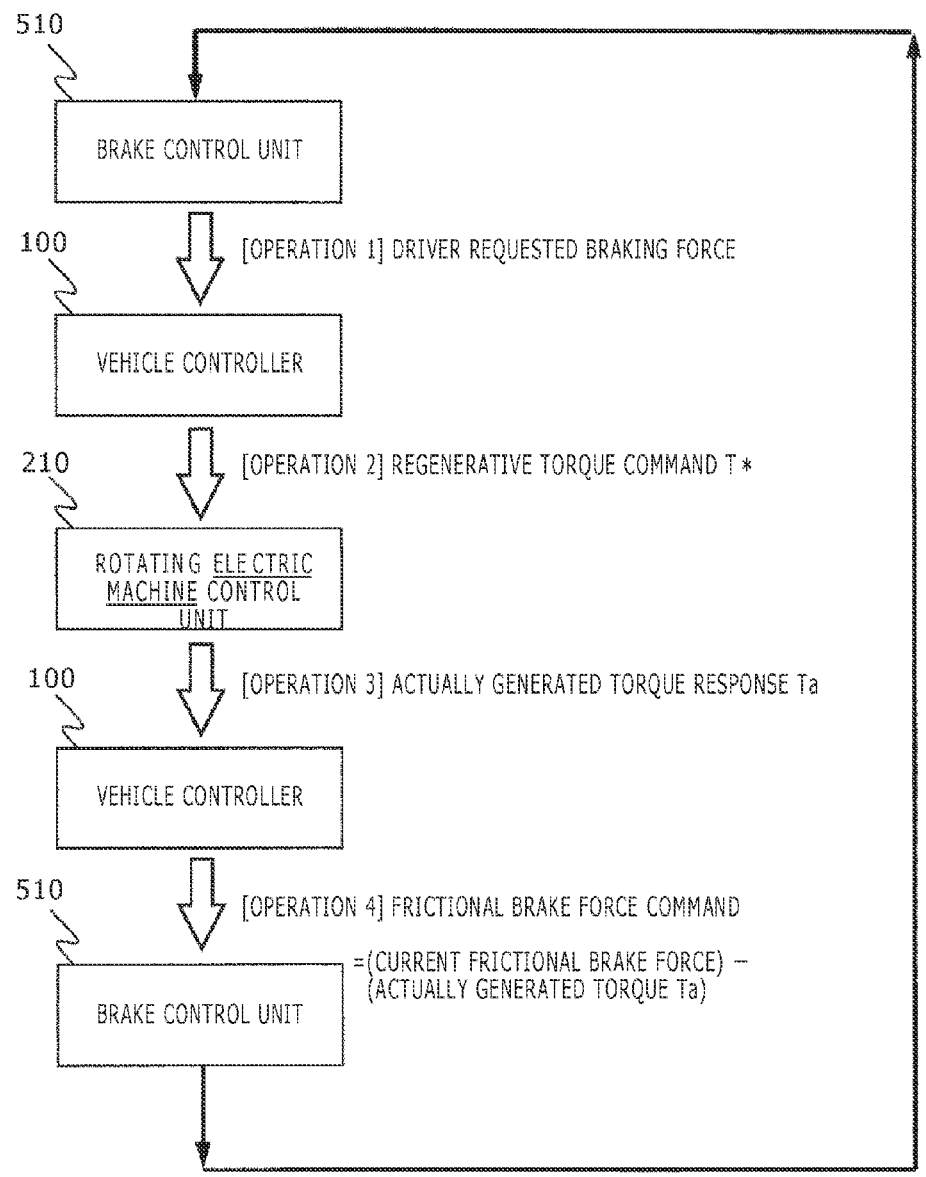
FIG. 8 is a diagram showing a process of switching between the frictional brake and the regenerative brake during operation of the regeneration cooperative brake.

The one between the points B1 (G1) to B4 (G4) is a section that part of a frictional brake share is switched to a regenerative brake share, that is, a so-called regeneration cooperative brake switching operation is performed. In this section, [Operation 1] to [Operation 4] shown in FIG. 8 are repetitively executed in this section while maintaining the driver requested braking force expressed by Formula (1), and the part of the frictional brake force is gradually switched to the regenerative brake force.

(Driver Requested Braking Force)=(Frictional Brake Force)+(Regenerative Brake Force)   (1).

Although the switching operation is terminated at the point B4 (G4) in FIG. 6, a current apportionment amount, that is, a target that the driver requested braking force is switched from the frictional brake force to the regenerative brake force up to what extent is determined by the vehicle controller 100. The vehicle controller 100 determines a target value for apportionment by taking the traveling stability of the electric motor car 1 into consideration and taking that a feeling of strangeness is not given to the driver into consideration.

When the vehicle speed of the electric motor car 1 is reduced as shown in FIG. 7, the vehicle controller 100 gradually switches the part of the regenerative brake force to the frictional brake force between the points B5 (G5) to B6 (G6) reversely to that in the section B1 (G1) to B4 (G4), while maintaining the driver requested braking force. Also this switching operation is attained by repeating [Operation 1] to [Operation 4] in FIG. 8.

[Operation 1]

When the driver steps on the brake, the brake stepping amount is detected by the brake pedal stroke sensor 500a of the regeneration cooperative brake equipment 500. The driver requested braking force arithmetic operation unit 510a of the brake control unit 510 arithmetically operates the braking force that the driver requests on the basis of a result of detection by she brake pedal stroke sensor 500a. The driver requested braking force that is a result of that arithmetic operation is transmitted to the vehicle controller 100 over the first CAN 110.

[Operation 2]

When the regenerative and frictional braking forces distribution arithmetic operation unit 100a (see FIG. 2) provided on the vehicle controller 100 receives the driver requested braking force, the regenerative and frictional braking forces distribution arithmetic operation unit 100a determines the apportionment amount when the part of the driver requested braking force is to be apportioned to the regenerative brake force, while taking the traveling stability of the electric motor car 1 into consideration and taking care so as not give the feeling of strangeness to the driver. The regenerative torque command T* that is apportionment information thereof is transmitted to the rotating electrical machine control unit 210 over the second CAN 120.

[Operation 3]

The rotating electrical machine control unit 210 causes the rotating electrical machine 900 to generate the regenerative torque in accordance with the received regenerative torque command T*. In addition, in the actually generated torque arithmetic operation unit 220b provided on the current arithmetic operation unit 220, the actually generated torque Ta based on the currents Idc and Iqc that flow through the rotating electrical machine 900 is arithmetically operated. This actually generated torque Ta is transmitted to the vehicle controller 100 over the second CAN 120. The actually generated torque Ta is obtained by the following Formula (2) when assuming that Pn is a number of pole pairs of the rotating electrical machine 900, ψ is a rotor magnet magnetic flux, Ld is a d-axis inductance of the three-phase coil, and Lq is a q-axis inductance.

$$Ta=Pn \times \psi \times Iqc+Pn \times (Ld-Lq) \times Idc \times Iqc \qquad (2).$$

[Operation 4]

Upon receiving the actually generated torque Ta of the rotating electrical machine 900, the regenerative and frictional braking forces distribution arithmetic operation unit 100a of the vehicle controller 100 arithmetically operates the regenerative brake force by the actually generated torque Ta. Then, it transmits the frictional brake force obtained by subtracting the regenerative brake force from the driver requested braking force to the brake control unit 510 as a frictional brake force command over the first CAN 110. The brake control unit 510 changes the frictional brake force in accordance with the received frictional brake force command.

Then, returning to [Operation 1], [Operation 1] to [Operation 4] are repetitively executed. In the switching operation section of the points B1 (G1) to B4 (G4). In this switching operation, since the driver requested braking force is always arithmetically operated by [Operation 1], it can be tracked even if the brake stepping force of the driver is changed. As described above, since in the regeneration cooperative brake control, part of the kinetic energy of the electric motor car 1 to be discarded as frictional heat by the frictional brake is converted into the regenerative electric power of the rotating electrical machine 900 so as to charge the battery 300 with that regenerative electric power, it contributes to improvement of electricity efficiency of the electric motor car 1.

The control shown in FIG. 6 is the one showing the operation when the battery 300 is in a normal state and is basically the same as the conventional, regeneration cooperative brake control. Next, a case where abnormality (Fail) has occurred in the battery 300 during regeneration cooperative braking, which is a feature of the present embodiment, will be described in detail.

(Battery Diagnosis Operation)

Figure 9:
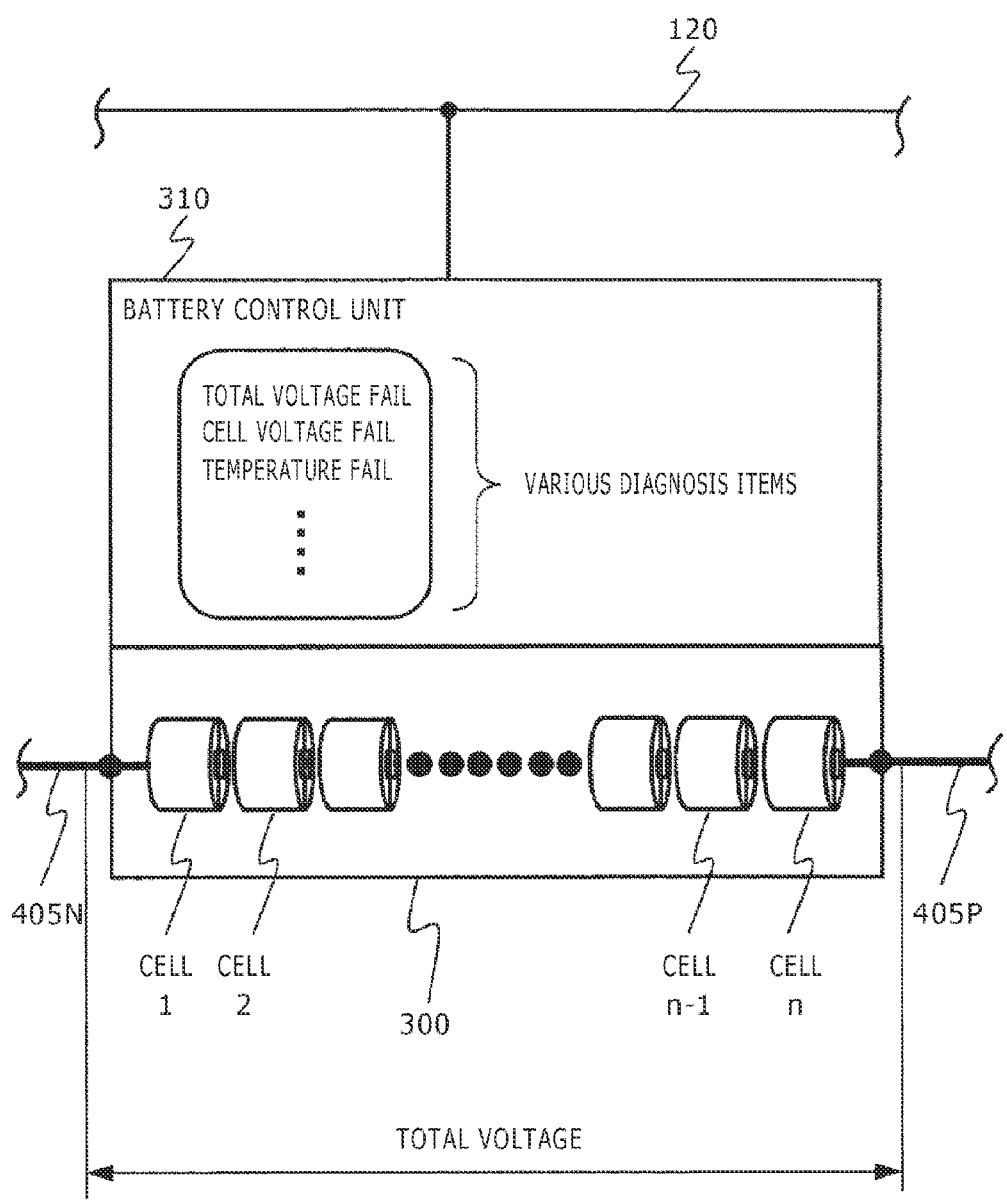
FIG. 9 is a diagram showing a battery control unit 310 and a battery 300.

First, a battery diagnosis by the battery control unit 310 will be described. FIG. 9 is a diagram showing the battery control unit. 310 and the battery 300. In the battery 300, a plurality of cells (n cells in FIG. 9) is arranged and the n cells are series or parallel connected to produce the total voltage of the battery 300. The battery control unit 310 always monitors various pieces of information on the battery, for example, the total voltage, a temperature, a cell voltage and so forth and starts the battery diagnosis (including, for example, a cell voltage diagnosis, a total voltage diagnosis and so forth) when it detects the abnormality. Describing in more detail, in the cell voltage diagnosis, it monitors whether the voltage of each of the n cells in FIG. 9 is within a threshold value range of an allowable maximum voltage and an allowable minimum voltage. In the total voltage diagnosis, it monitors whether the total voltage that is the sum of the voltages of the respective n cells is within a threshold value range of an allowable maximum voltage and an allowable minimum voltage. Since, when the capacity of the battery is increased, in particular, as in the EV (the electric vehicle), the number of cells is increased and a variation in voltage of the respective cells also becomes large, it becomes important to monitor the cell, voltage.

Figure 10:
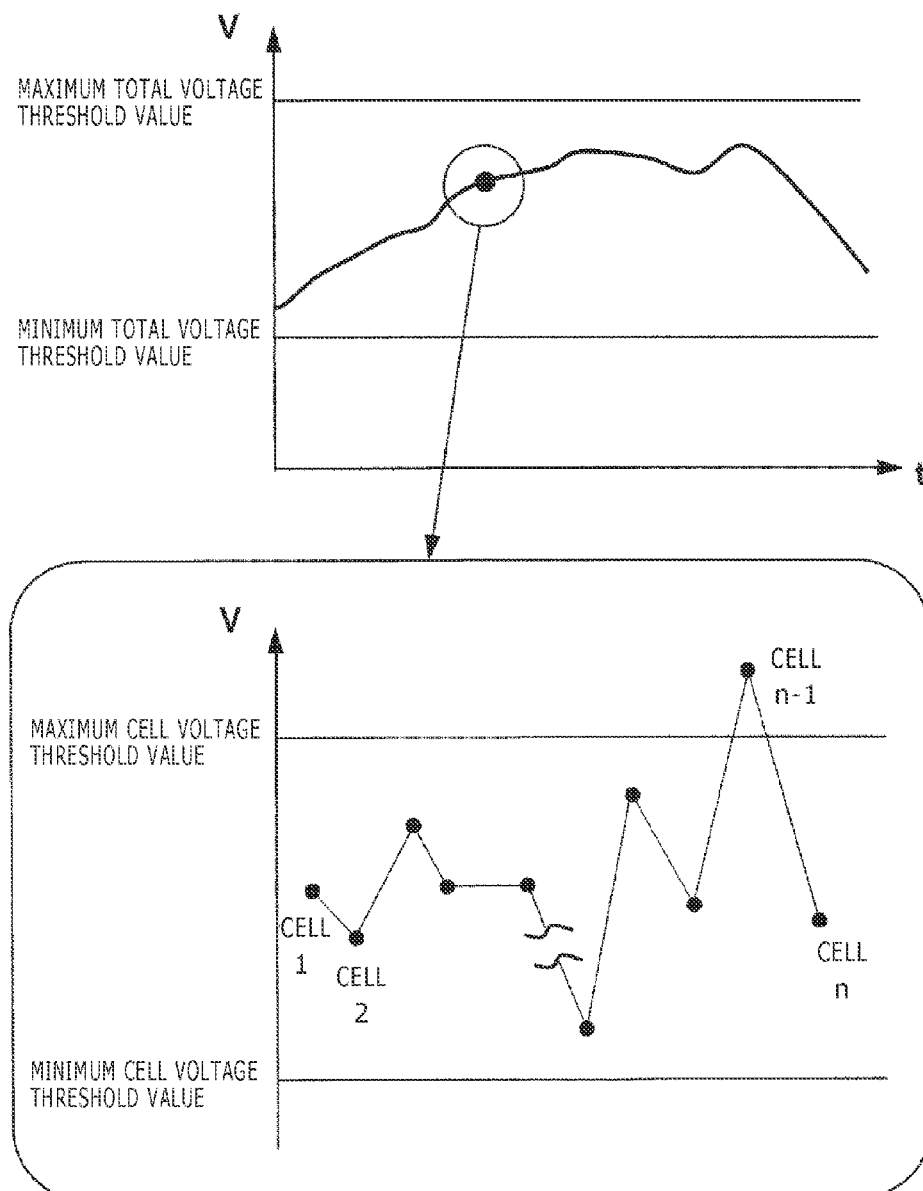
FIG. 10 is a diagram showing one example of battery abnormality.

For example, in an example shown in FIG. 10, although the battery total voltage is within the normal range, the n–1st cell voltage exceeds the threshold value. Incidentally, an upper-side drawing in FIG. 10 is the one that shows a change with time in total voltage of the battery 300, and a lower-side drawing is the one that shows the cell voltages of the first cell to the n-th cell at a time marked with a black circle in the upper-side drawing. In a case where the cell voltage of any one of the cells exceeds the threshold value as mentioned above, conventionally, a process of suspending the regeneration cooperative brake as shown in FIG. 11 is executed in order to protect that cell.

The vehicle controller 100 obtains the result of diagnosis for the battery 300 from the battery control unit 310 over the second CAN 120. Conventionally, when the Fail signal of the battery 300 is received from the battery control unit 310 over the second CAN 120, the vehicle controller 100 inhibits charging and discharging of the battery 300 and sends a command to the rotating electrical machine control unit 210 so as to restrict the powering and regenerating operations, to suspend the switching operation of the power converter 200 and to perform cutting-off of the relay 450a provided on the DC harness 450P and the DC harness 450N.

For example, when charging and discharging of the battery 300 are inhibited because of the abnormality of the total voltage during regeneration cooperative braking and the vehicle controller 100 receives the Fail signal that is the result of diagnosis, the vehicle controller 100 enters the operation of suspending the regeneration cooperative brake in order to immediately stop the regeneration operation.

Figure 11:
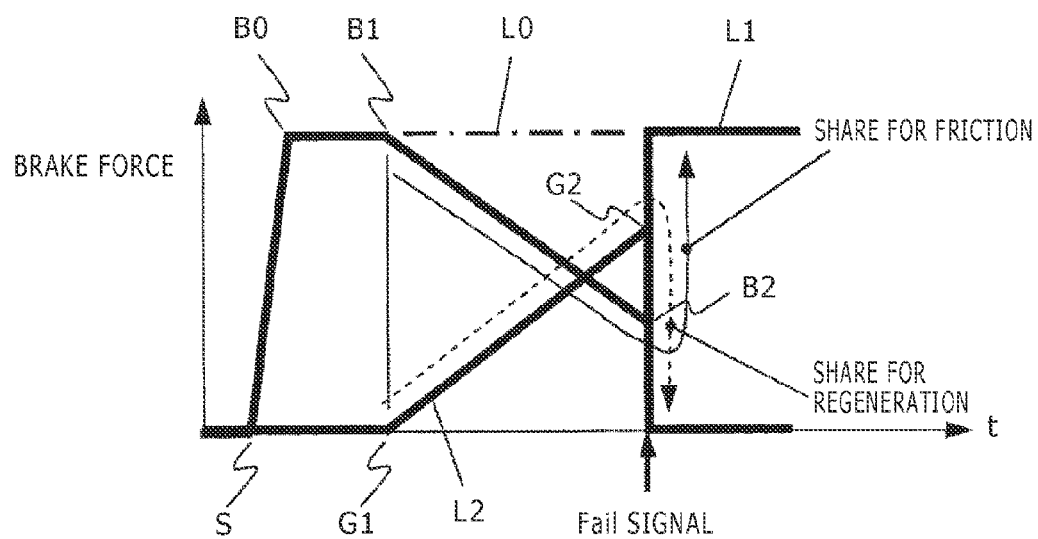
FIG. 11 is a diagram showing frictional brake force and regenerative brake force in a case where a suspension operation has been instantaneously performed.

FIG. 11 is a diagram showing the frictional brake force and the regenerative brake force in a case where the suspending operation has been instantaneously performed. At the point B2 (G2), upon receiving the Fail signal from the battery control unit 310, the vehicle controller 100 instantaneously reduces the generative brake force to zero while maintaining the driver requested braking force shown by the line L0, and increases de frictional brake force up to the driver requested braking force. However, in reality, it is difficult to perform switching perfectly, instantaneously and simultaneously, not only the feeling of strangeness caused by a brake force switching shock is given to the driver, but also the traveling stability of the electric motor car 1 is worsened and worsening of the traveling stability is remarkably exhibited on a place where, in particular, the road surface condition is bad.

Figure 12:
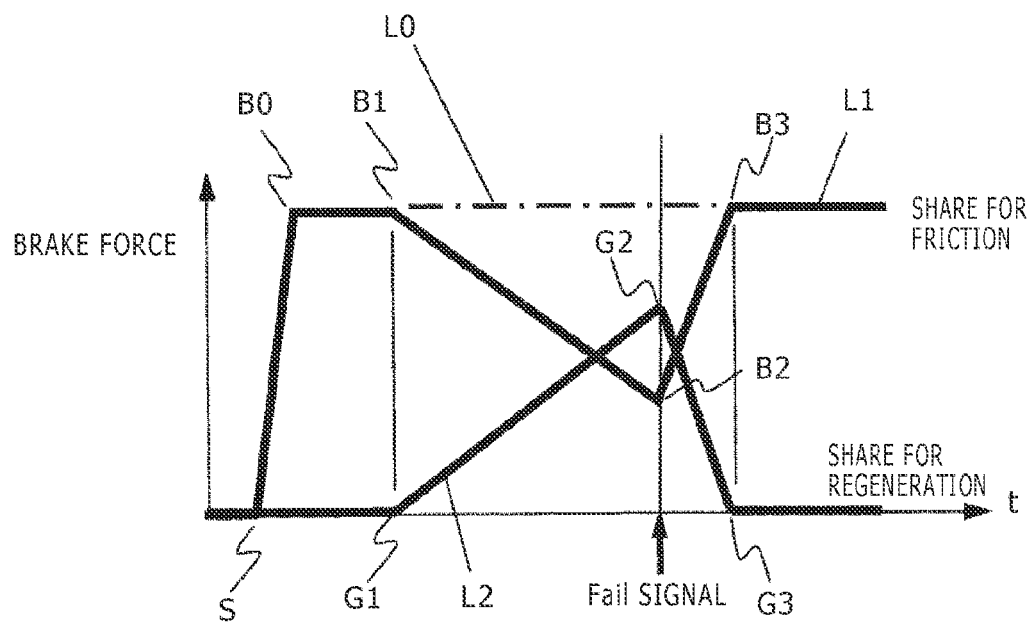
FIG. 12 is a diagram showing a regeneration cooperative brake suspending process in the present embodiment.

Therefore, the present embodiment is so made as to perform a process of suspending the regeneration cooperative brake as shown in FIG. 12. Upon receiving the Fail signal from the battery control unit 310 at the point B2(G2), the vehicle controller 100 repetitively executes the operations shown in FIG. 8 while maintaining the driver requested braking force, makes the regenerative brake force undergo a change of the points G2→G3 and makes the frictional, brake force undergo a change of the points B2→B3, and switches to the frictional brake force as soon as possible while giving priority to the traveling stability of the electric motor car 1.

Even in a case where the battery Fail has occurred during regeneration cooperative braking, the driver requested braking force is maintained by performing such regeneration cooperative brake control and the operation of the regeneration cooperative brake of the electric motor car 1 can be suspended safely.

Incidentally, in a case of the regeneration cooperative brake control shown in FIG. 12, since the regenerative brake force remains in a period going from the point G2 to the point G3, the battery 300 is charged with the regenerative electric power generated by the rotating electrical machine 900. Thus, the present embodiment has been made so as to perform the process of suspending the regeneration cooperative brake such as that shown in FIG. 12 and also perform such a battery protecting operation as described in the following from the viewpoint of battery protection.

Figure 13:
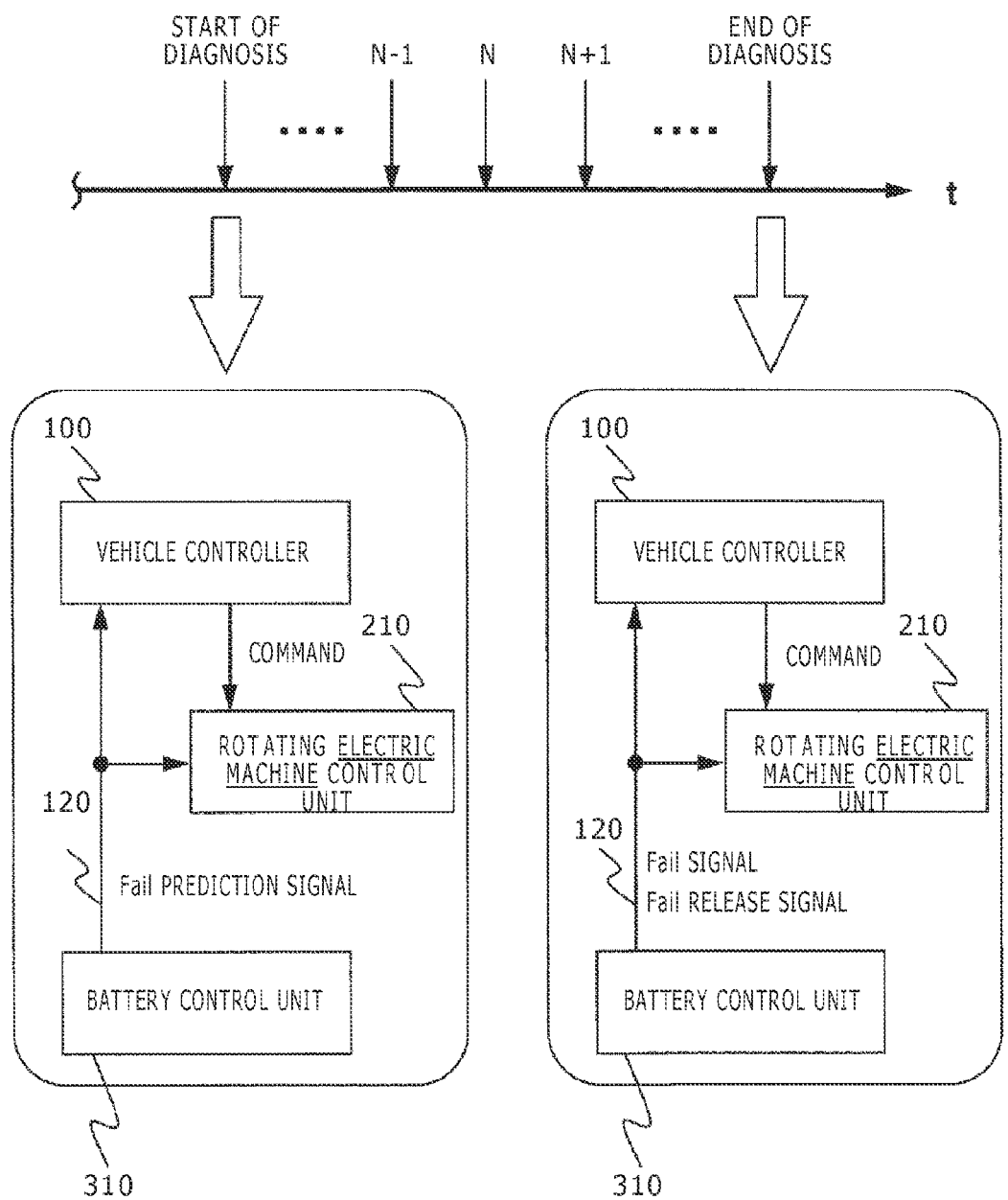
FIG. 13 is a diagram showing a process of battery diagnosis of the battery control unit 310 in the present embodiment.
Figure 14:
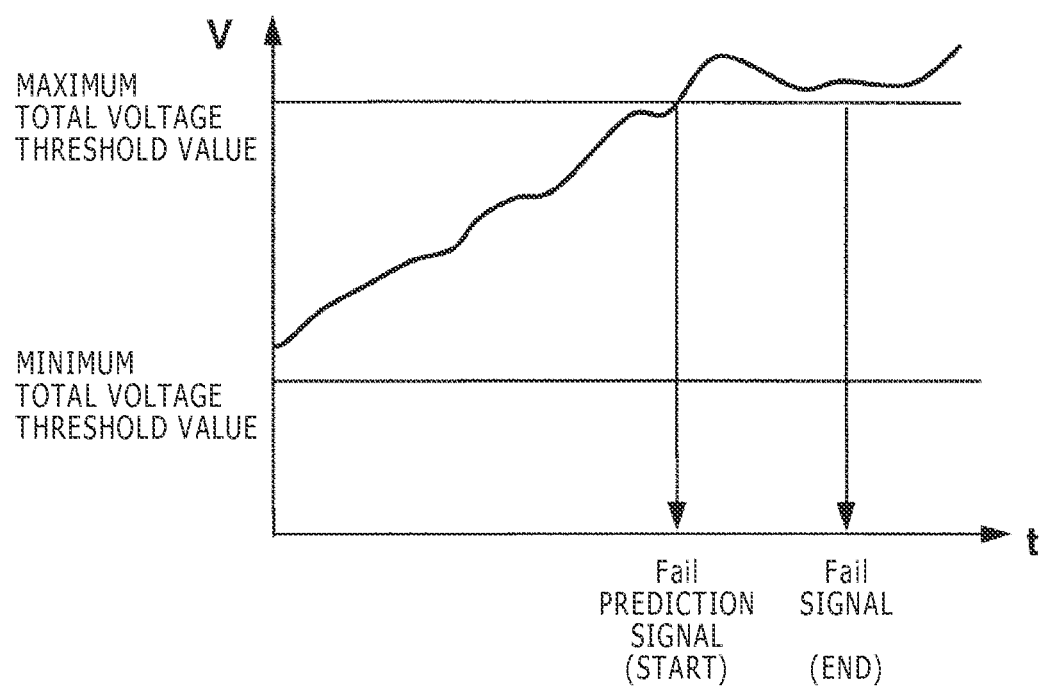
FIG. 14 is a diagram showing a battery state in a case where a Fail prediction signal and a Fail, signal are to be output.
Figure 15:
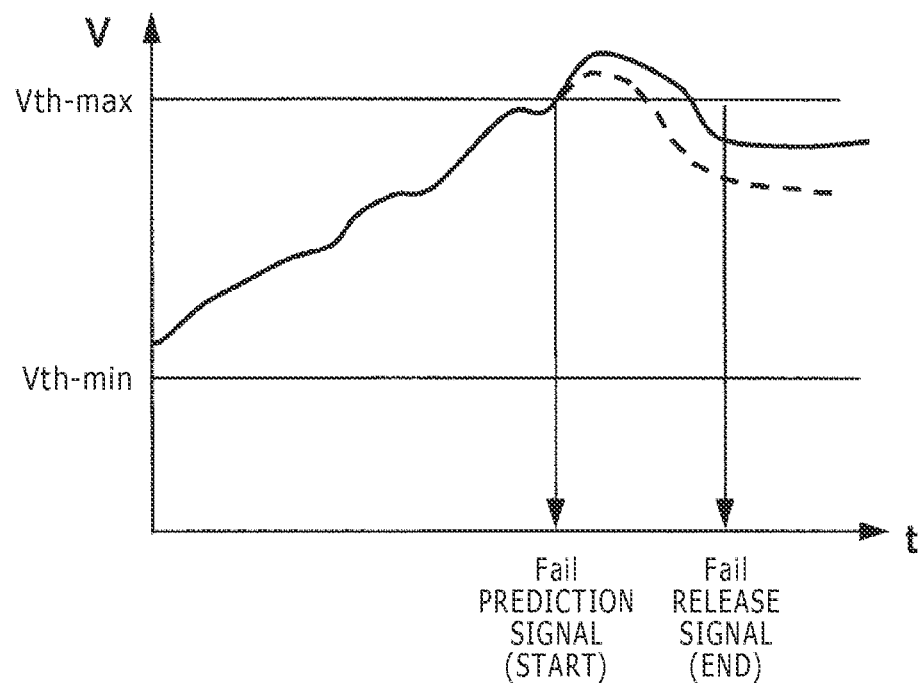
FIG. 15 is a diagram showing a battery state in a case where the Fail prediction signal and a Fail release signal are to be output.

FIGS. 13 to 15 are diagrams describing a diagnosis operation in the present embodiment. Here, as shown by solid lines in FIGS. 14 and 15, a case where the abnormality of the battery total voltage is detected to enter the diagnosis operation will be described by way of example. Upon detecting that the battery total voltage has exceeded a maximum total voltage threshold value Vth-max shown in FIG. 14, the battery control unit 310 starts the diagnosis and transmits a Fail prediction signal onto the second CAN 120. This Fail prediction signal is a signal for informing that although the battery state is not yet in the abnormal state (the Fail state), it will enter the battery abnormal state if the regenerative brake is used as it is and therefore the protecting operation is necessary.

In the battery diagnosis, the cell voltage diagnosis, the total voltage diagnosis and so faith are included as mentioned above and the diagnosis is performed a plurality of times at predetermined time intervals. Then, in a case where detection of the battery total voltage abnormality has been continued even after the diagnosis has been performed the plurality of times as shown in FIG. 14, the battery control unit 310 terminates the diagnosis and transmits the Fail signal onto the second CAN 120. Then, when this Fail signal is received by the rotating electrical machine control unit 210, the frictional brake force and the regenerative brake force are controlled, leaving the driver requested braking force satisfied as exhibited by lines shown along the section B2 to B3 and the section G2 to G3 in FIG. 12, and finally only the frictional brake force remains.

On the other hand, in a case where the total voltage of the battery has been made lower than the maximum total voltage threshold value Vth-max before termination of the plurality of times of the diagnosis as shown by a solid line in FIG. 15, that is, when it enters a state that battery total voltage abnormality detection is not detected during the diagnosis of the plurality of times, the battery control unit 310 terminates the diagnosis operation and transmits the Fail release signal onto the second CAN 120.

Incidentally, in the embodiment of the present invention, the current command arithmetic operation unit. 220 of the rotating electrical machine control unit 210 is provided with the battery decision unit 220c as shown in FIG. 2 and is configured such that it can directly receive the battery diagnosis information (the Fail prediction signal, the Fail signal, the Fail release signal and so forth) that the battery control unit 310 has transmitted onto the second CAN 120 not through the vehicle controller 100. By configuring in this way, there is such an advantageous effect that the battery Fail during regeneration cooperative braking can be detected in advance, thereby coping with the situation in advance without waiting the command from the vehicle controller 100.

(Battery Protecting Operation)

In the present embodiment, upon receiving the Fail, prediction signal that the battery control unit 320 has transmitted onto the second CAN 120 during operation of the regeneration cooperative brake, the battery diagnosis decision unit 220c of the current command arithmetic operation unit 220 performs a process of increasing the internal loss of the rotating electrical machine 900 in preparation for the battery Fail.

As stated above, during regeneration cooperative, braking, the driver requested braking force is apportioned to the frictional brake force and the regenerative brake force so as to return the part of the kinetic energy of the vehicle that has totally turned to heat of the friction brake and has been discarded conventionally to the battery 300. That is, the part of the kinetic energy of the vehicle is converted into the regenerative electric power (the AC current) by the rotating electrical machine 900 and it is further converted from the AC power into the DC-power by the power converter 200 and the battery 300 is charged with it.

Here, it is not the case that the regenerative electric power is wholly used as the charging power and it is partially consumed as the internal loss of the rotating electrical machine 900 as shown in Formula (3). If the internal loss of the rotating electrical machine 900 can be increased without changing the regenerative torque of the rotating electrical machine 900 from Formula (3), the charging power to the battery 300 can be reduced.

(Regenerative Electric Power)=(Charging Power to the Battery 300)+(Internal Loss of the Rotating Electrical Machine 900) (3).

Figure 16:
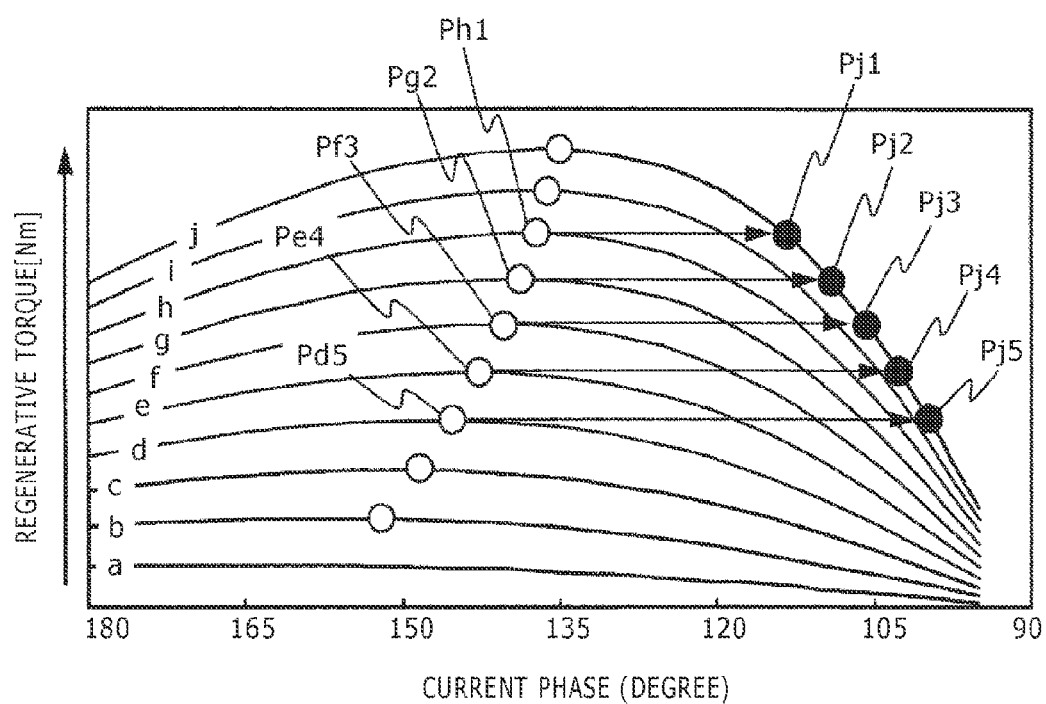
FIG. 16 is a diagram showing a relation between regenerative torque and a current phase.
Figure 17:
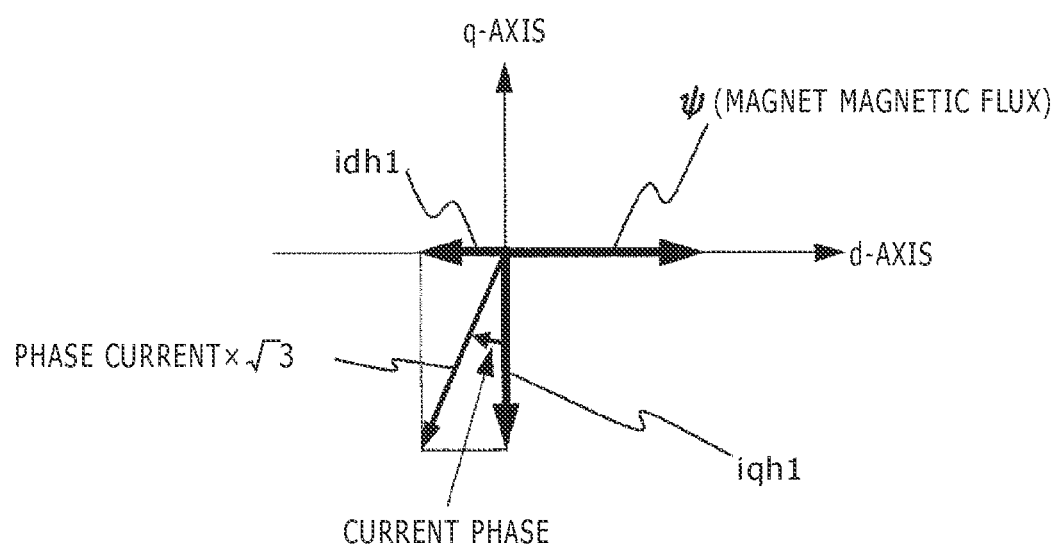
FIG. 17 is a vector diagram, of a d-axis current Id and a q-axis current Iq in the current phase at a point Ph1.
Figure 18:
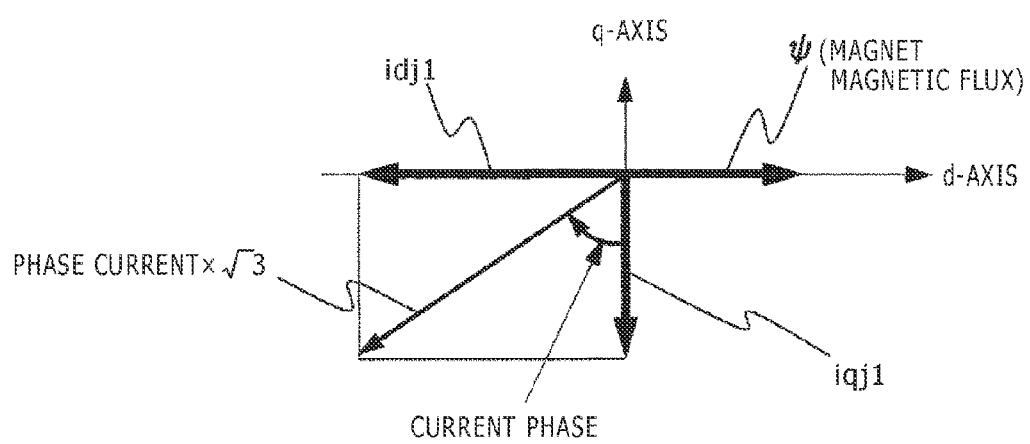
FIG. 18 is a vector diagram of the d-axis current Id and the q-axis current Iq in the current phase at a point Pj1.

The present embodiment is made so as to increase the internal loss without changing the regenerative torque of the rotating electrical machine 900 by a method as described hereinafter. FIGS. 16 to 18 are diagrams for describing relations between phase currents flowing through the U-phase coil 900U, the V-phase coil 900V and the N-phase coil 900W of the rotating electrical machine 900 and the regenerative torque.

FIG. 16 is the one that shows how the relation between the phase currents flowing through the U-phase coil 900U, the V-phase coil 900V and the U-phase coil 900W of the rotating electrical machine 900 and the regenerative torque changes in a phase of current on the d-q axis. A line a shows a relation between the phase of current and the regenerative torque when the phase current is a. Likewise, lines b to j show relations between the phases of current and the regenerative torque when the phase currents are b to j. The phase current is increased as a→j, and the phase current j is a maximum phase current allowed to be flown into the rotating electrical machine 900. As shown in FIG. 16, if the phase of current is made different in spite of the same phase current, the magnitude of the generated torque will be greatly changed. In FIG. 16, a point marked with a white circle is the point where the maximum regenerative torque is generated when the phase of current of the phase current has been changed, that is, a maximum efficiency point.

An effective value of the phase current is as in Formula (4) when expressed using the d-axis current Id and the q-axis current. Incidentally, in Formula (4), "^2" denotes a square. FIG. 17 is the one that the d-axis current Id and the q-axis current Iq in the phase of current that attains the maximum efficiency point marked with the white circle in FIG. 16 have been expressed in the form of a vector diagram.

$$\text{Phase Current} = (\sqrt{(Id^2 + Iq^2)})/\sqrt{3} \quad (4).$$

Here, a point Ph1 will be focused on. Upon horizontally shifting from this point Ph1 to a point Pj1, the generated regenerative torque is the same and the phase current value shows a change (an increase) of h→j. FIG. 18 is the one that the d-axis current Id and the q-axis current Iq in the phase of current at the point Pj1 have been expressed in the form of the vector diagram. The phase current is h<j, and the current mainly on the d-axis side is increased due to shifting of the point Ph1→the point Pj1. The current on the d-axis side is a current that flows in the magnet magnetic flux ψ direction of the rotating electrical machine 900 and the current that will be used not as the torque but as the internal loss of the motor.

In FIG. 16, although the point Pj1 shows the maximum phase current allowed to be flown into the rotating electrical machine 900, it shows the same regenerative torque as the point Ph1. That is, the point Pj1 is a minimum efficiency point. Likewise, points marked with black circles Pj1, Pj2, Pj3, Pj4 and Pj5 are the minimum efficiency points corresponding to the maximum efficiency points Ph1, Pg2, Pf3, Pe4 and Pd5, and the mutually corresponding ones show the same regenerative torque.

Figure 19:
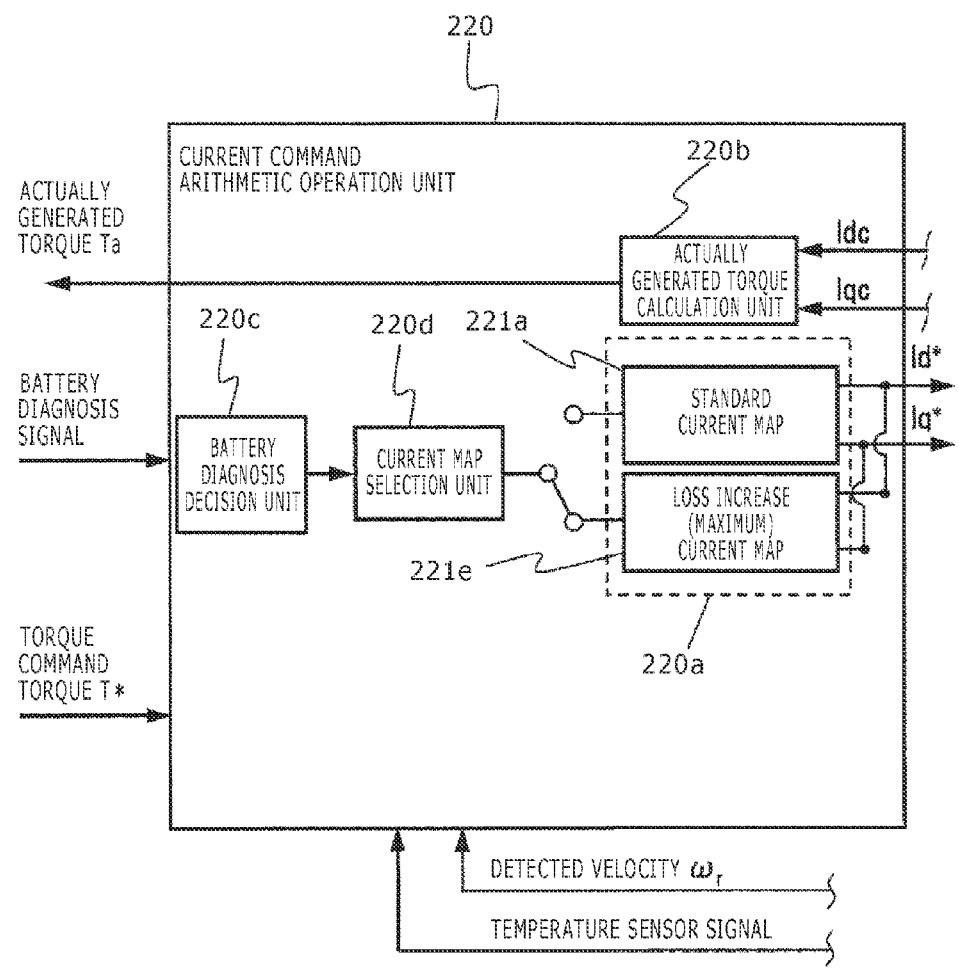
FIG. 19 is a diagram showing in more detail a current map 220a of a current command arithmetic operation unit 220 shown in FIG. 4.

FIG. 19 is the one that shows in more detail the current map 220a in the current command arithmetic operation unit 220 shown in FIG. 4, and the d-axis current Id and the q-axis current Iq are mapped on a standard current map 221a on the basis of current phases that attain the maximum efficiency points shown by the white circles Ph1, Pg2, Pf3, Pe4 and Ph5. On the other hand, the d-axis current Id and the q-axis current Iq are mapped on a loss increase current map 221e on the basis of current phases that attain the minimum efficiency points shown by the black circles Pj1, Pj2, Pj3, Pj4, and Pj5.

The current map selection unit 220d shown in FIG. 19 selects one of the standard current map 221a and the loss increase current map 221e in accordance with the situation. In the case of the present embodiment, the standard current map 221a is normally selected, and in a case of the protecting operation during operation of the regeneration cooperative brake that will be described in the following, the loss increase current map 221e is selected.

First Example

Figure 20:
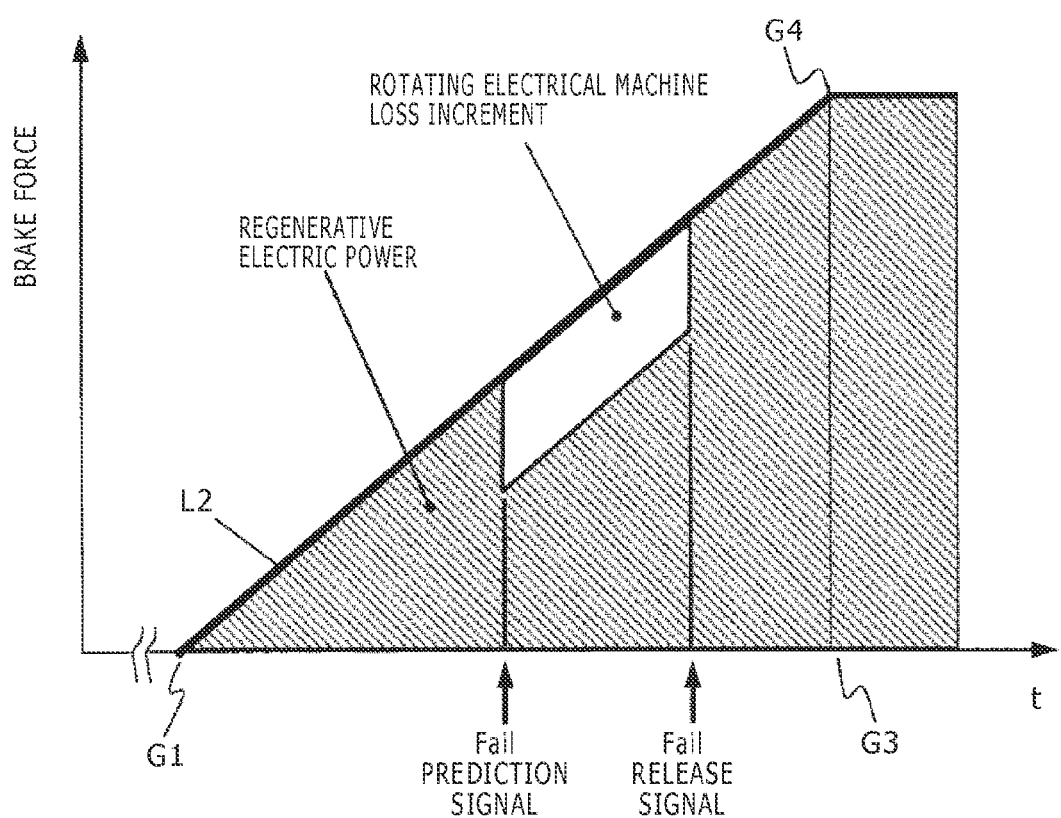
FIG. 20 is a diagram showing a first example of a protection operation.

FIG. 20 is a diagram showing a first example of the protecting operation. In the protecting operation in the first example, when the battery diagnosis decision unit 220c receives the Fail prediction signal during operation of she regeneration cooperative brake, the necessity to increase the internal loss of the rotating electrical machine 900 is recognized for battery protection in the background even in the absence of a command from the vehicle controller 100, and the current map selection unit 220d switches the current map from the standard current map 221a to the loss increase current map 221e. The current command arithmetic operation unit 220 of the rotating electrical machine control unit 210 searches the d-axis current command Id* and the Q-axis current command Iq* from within the loss increase current map 221e on the basis of the torque command T* and the angular velocity ωr.

FIG. 20 shows a line L2 of a part relevant to the regenerative brake in the course from the point B1 (G1) to the point B4 (G4) in FIG. 6. In the example shown in FIG. 20, there is shown a process in a case where in the course of the points G1→G4, the battery diagnosis decision unit 220c has received the Fail prediction signal from the battery control unit 310 and thereafter has received the Fail release signal. This corresponds to the case where the battery total voltage has been changed as in FIG. 15.

The current map selection unit 220d in FIG. 19 selects the standard current map 221a based on the maximum efficiency points until the battery diagnosis decision unit 220c receives the Fail prediction signal. At this time, the internal loss of the rotating electrical machine 900 in Formula (3) is in a smallest state. In FIG. 20, the regenerative electric power at this time is shown by a hatched region under the line L2. In a state that the standard current map 221a is being used before the Fail prediction signal is received, the whole part under the line L2 is hatched.

In the first example, in a case where the battery diagnosis decision unit 220c has received the Fail prediction signal, an increase in internal loss of the rotating electrical machine 900 is promoted for protecting the battery in the background even in the absence of the command from the vehicle controller 100. Therefore, when the Fail prediction signal has been received, the current map selection unit 220d switches the current map from the standard current map 221a to the loss increase current map 221e. As a result, the d-axis current command Id* and the q-axis current command Iq* that would maintain the regenerative torque of the rotating electrical machine 900 at the regenerative torque command T* from the vehicle controller 100 and in addition would increase the internal loss of the rotating electrical machine 900 are output from the current command arithmetic unit 220 to the current control unit 230 in FIG. 4.

When the current map is switched from the standard current map 221a to the loss increase current map 221e, the regenerative electric power is reduced by a loss increment of the rotating electrical machine 900. Thus, the area of the hatched region that shows the regenerative electric power is reduced by the loss increment of the rotating electrical machine 900 as shown in FIG. 20. A blank region under the line 12 shows the loss increment of the rotating electrical machine 900.

Thereafter, when the Fail release signal is received by the battery diagnosis decision unit 220c, it is decided that the necessity for protecting the battery in the background is eliminated and the process of increasing the internal loss of the rotating electrical machine 900 is suspended even in the absence of the command from the vehicle controller 100. Then, the current map decision unit 220d switches the current map from the loss increase current map 220e to the standard current map 220a. As a result, the blank region is eliminated and the whole part under the line L2 becomes the hatched region that shows the regenerative electric power. By doing so, the process of increasing the internal loss of the rotating electrical machine 900 is suspended while maintaining the regenerative torque command from the vehicle controller 100, and the d-axis current command Id* and the q-axis current command Iq* that are in a highly efficient state are output to the current control unit 230.

When the control such as that shown in FIG. 20 is performed, the battery total voltage obtained after reception of the Fail prediction signal is changed as shown by a broken line in FIG. 15. The regenerative electric power to be returned to the battery 300 is reduced by increasing the loss of the rotating electrical machine 900 by taking advantage of reception of the Fail prediction signal, and the battery total voltage is reduced in comparison with a case (a solid line) where switching of the current maps is not performed. As a result, a margin is generated in battery charging and even in a case where the switching operation such as that shown by G2 to G3 (B2 to B3) in FIG. 12 has been performed, the battery 300 can be protected against battery charging.

Figure 21:
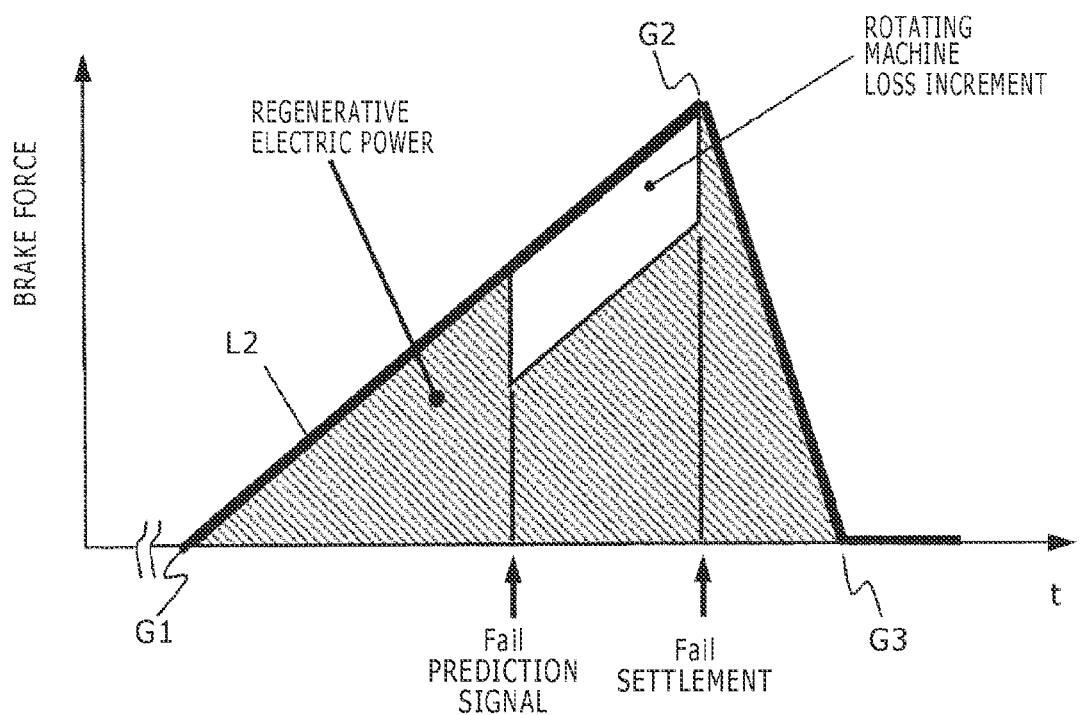
FIG. 21 is a diagram showing a case where Fail release is not performed and battery Fail has been settled in the first example.

FIG. 21 is a diagram showing a case (a case where the Fail signal has been received) where Fail releasing is not performed and battery Fail has been settled at the point G2 in the first example. Here, similarly to the case of Fail releasing, when the Fail signal has been received, the current map is switched from the loss increase current map 221e to the standard current map 221a. Therefore, the entire region under the line L2 is hatched and the battery 300 is charged with the regenerative electric power between G2 to G3.

However, since the charging amount in this period is reduced because the loss of the rotating electrical machine 900 has been increased from reception of the Fail prediction signal up to Fail settlement, it becomes possible to have a margin for battery charging after Fail settlement and the battery 300 can be protected. It becomes possible to accept the regenerative electric power to be returned to the battery 300 with an enough margin between the points G2→G3 after battery Fail while maintaining the traveling stability of the electric motor car 1, by performing in advance such control as to reduce the charging amount in this way.

Second Example

Figure 22:
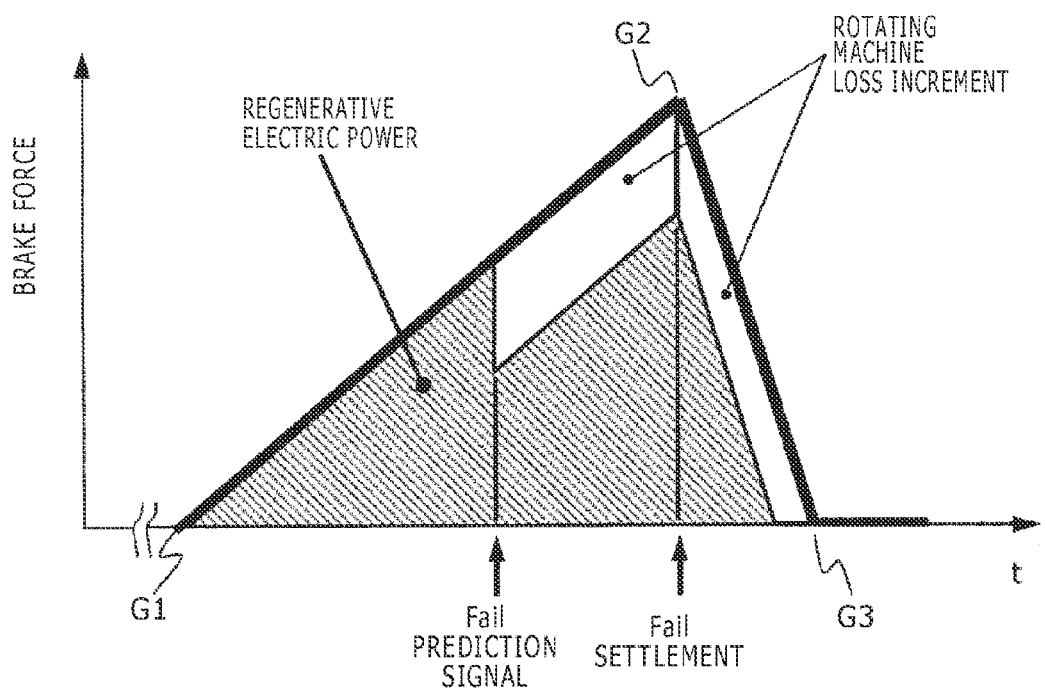
FIG. 22 is a diagram, showing a second example of the protection operation.

FIG. 22 is a diagram showing a second example of the protecting operation and is the one showing the operation in a case where after the Fail prediction signal has been received, the Fail signal has been further received as shown in FIG. 14. When the vehicle controller 100 receives the Fail signal, the regenerative torque command T* with which the regenerative brake force is reduced as G2 to G3 of the line L2 is transmitted from the vehicle controller 100 to the rotating electrical machine control unit 210 over the CAN 120. Then, in the second example, it is assumed that even after Fail settlement, selection of the current map is still maintained on the loss increase current map 221e. As a result, the loss of the rotating electrical machine 900 is increased also in the section G2 to G3 and the regenerative electric power is reduced by a loss increment shown by the blank region.

As is apparent from comparison of FIG. 22 with FIG. 21, in the case of the second example, not only the loss of the rotating electric machine 900 is increased, between Fail prediction and Fail settlement, but also the loss is increased in the section G2 to G3. As a result, the battery protecting effect is further improved in comparison with the example 1 shown in FIG. 21.

Third Example

Figure 23:
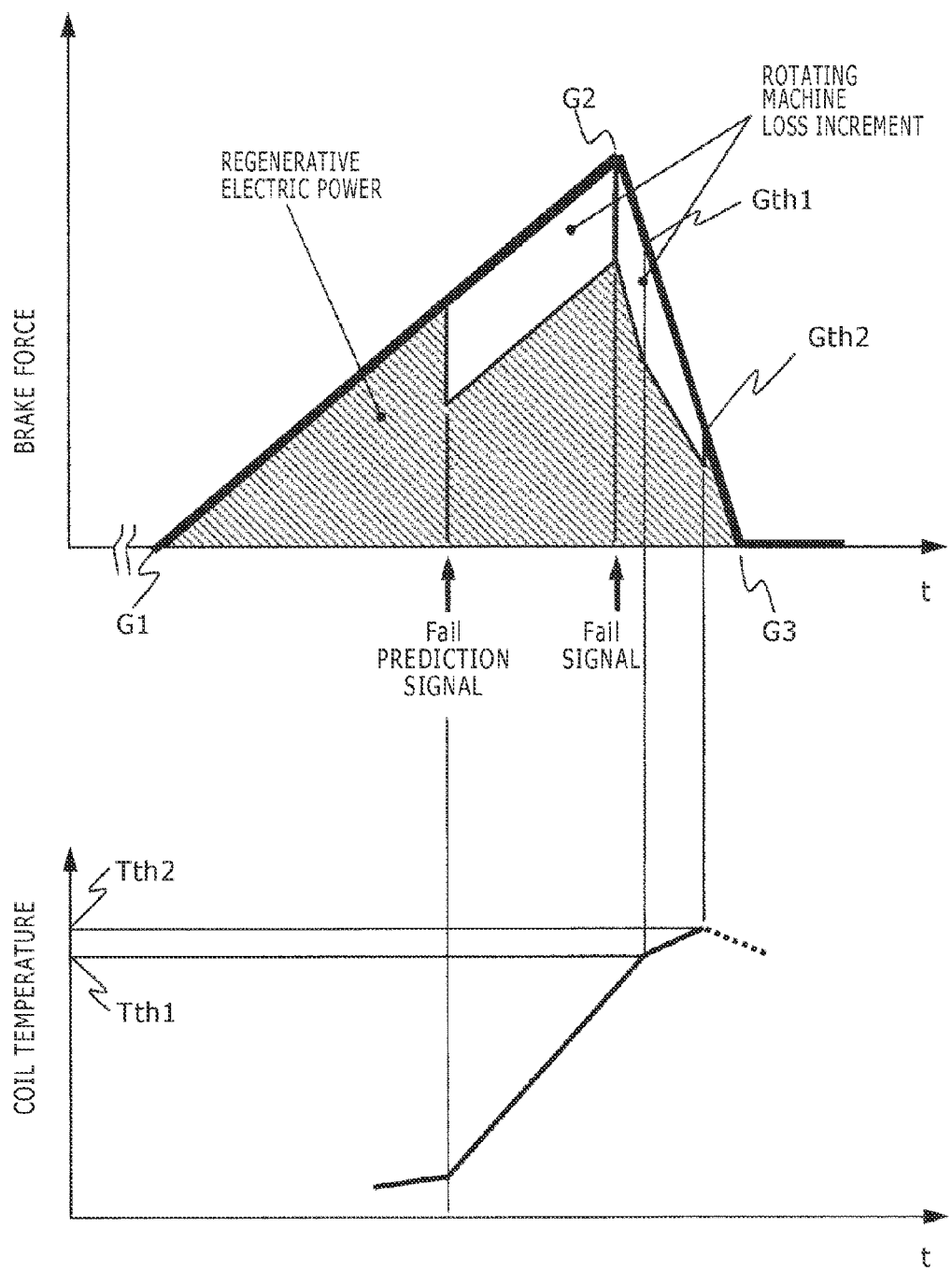
FIG. 23 is a diagram showing a third example of the protection operation.

FIG. 23 is a diagram showing a third example of the protecting operation. As mentioned above, in a case where the internal loss of the rotating electrical machine 900 has been increased, the increment of the internal loss mainly turns to Joule heat of the U-phase coil 900U, the V-phase coil 900V and the W-phase coil 900W and the coil temperature is risen. This temperature rise is detected by the coil temperature sensor 930 provided on the rotating electrical machine 900. A result of detection thereof is input into the current command arithmetic operation unit 220 of the rotating electrical machine control unit 210.

Figure 24:
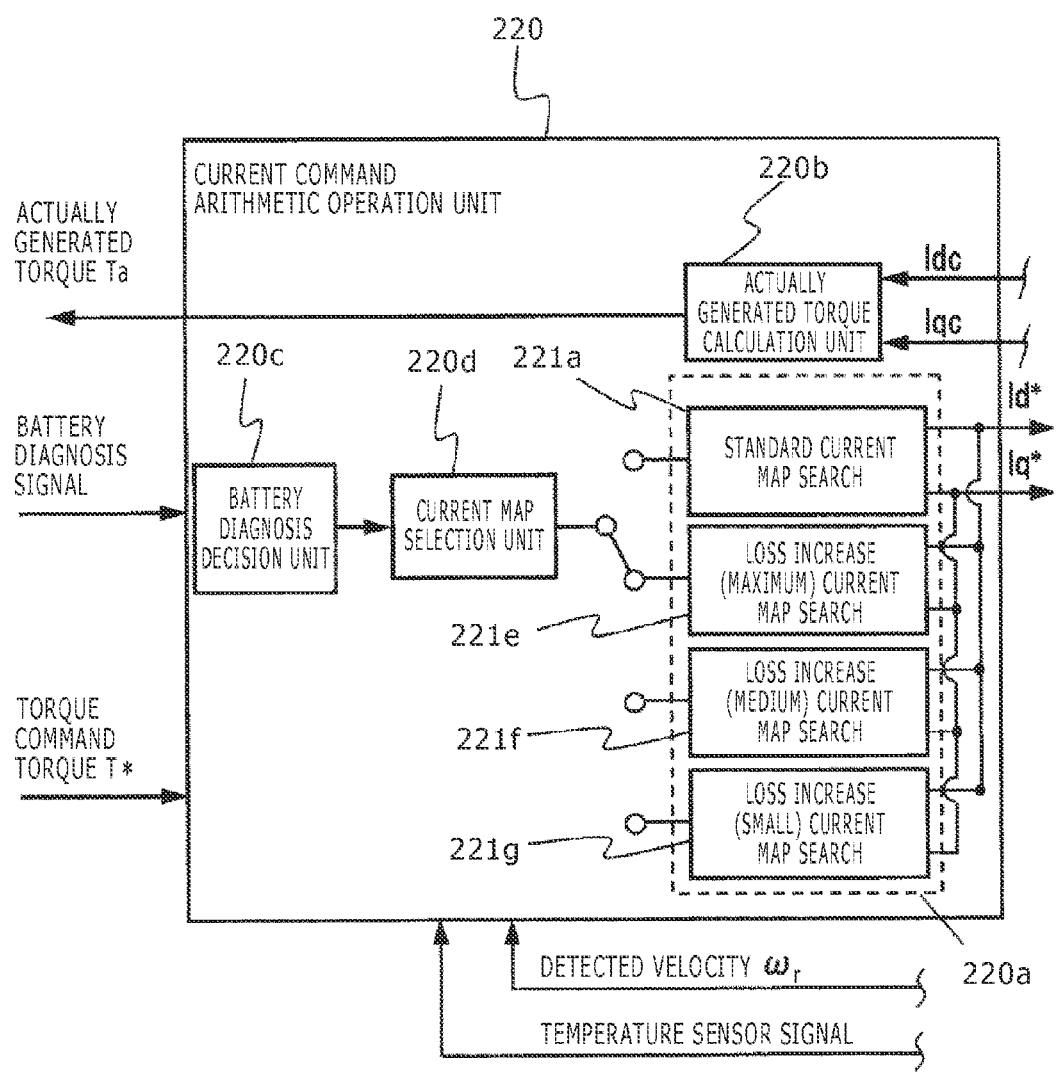
FIG. 24 is a diagram for describing a current map in the third example.

In the third example, as shown in a lower-side drawing of FIG. 23, two threshold values Tth1 and Tth2 are prepared for the coil temperature of the rotating electrical machine 900. Although a drawing shown on the upper side of FIG. 23 is the same as FIG. 22, it is different in way of increasing the loss of the rotating electrical machine 900 in the section G2 to G3. Here, the magnitude of the loss is varied in accordance with the coil temperature. Therefore, as shown in FIG. 24, the plurality of loss increase current maps are provided on the current command arithmetic operation unit 220. Which current map is to be used is selected by the current map selection unit 220d.

Figure 25:
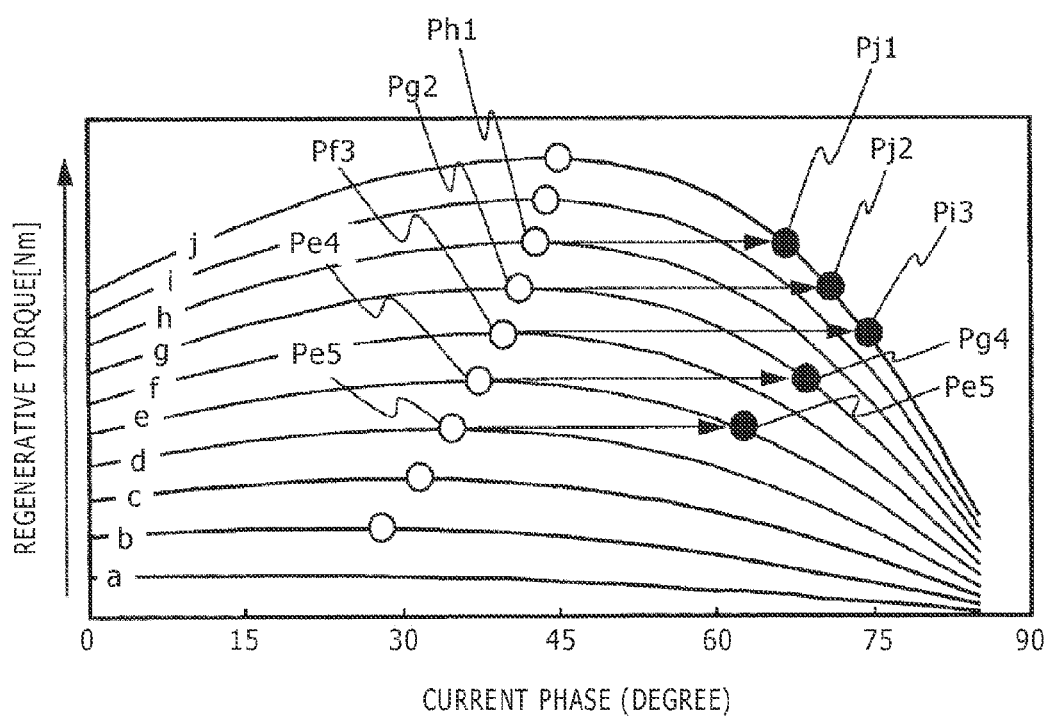
FIG. 25 is a diagram showing a relation between the regenerative torque and the current phase in a case where a plurality of loss increase current maps is to be provided.

In the example shown in FIG. 24, three loss increase current maps 221e, 221f and 221g are provided. The magnitude of the internal loss is increased in order of (the map 221e)>(the map 221f)>(the map 221g). For example, in FIG. 25, black-circled marks Pj1, Pj2 and Pj3 are of a case where the loss increase current map 221e has been applied, a black-circled mark Pg4 is of a case where the loss increase current map 220f has been applied, and a black-circled mark Pe5 is of a case where the loss increase current may 220g has been applied. Incidentally, although in the embodiment of the present invention, three kinds of the loss increase current maps have been provided, it is not limited to three kinds and more than that may be provided.

Since an internal loss increasing process for the rotating electrical machine 900 is started from when the battery diagnosis decision unit 220c of the rotating electrical machine control unit 210 has received the Fail prediction signal, the coil temperature is increased from when Fail prediction has been signaled as shown in the lower-side drawing of FIG. 23. At this time, it is assumed that, for example, the loss increase current map 221e in FIG. 24 is selected as the current map. When the coil temperature reaches the threshold value Tth1, the current command arithmetic operation unit 220 switches is to the loss increase current map 221*f* or 221*g* that is smaller than others in internal loss amount in order to lower the Joule heat of the coils. As a result, the rate of the internal loss becomes small and the rate of the regenerative electric power becomes large from a point Gth1 that the loss increase current map is switched from 221*e* to 221*f* or 221*g* as shown in the upper-side drawing of FIG. 23. In addition, an extent of coil temperature rise becomes small.

Further, in a case where the coil temperature has been risen and the coil temperature has exceeded the threshold value Tth2, the current command arithmetic operation unit 220 suspends the internal loss increasing process in order to protect the rotating electrical machine 900. That is, the current map selection unit 220*d* selects the standard current map 220*a*. Thus, the internal loss increment is reduced to zero from a point Gth2, and the coil temperature shows a lowering trend. As described above, since in the third example, the internal loss increase control, is performed while monitoring the coil temperature of the rotating electrical machine 900, and the internal loss increment is adjusted by switching the loss increase current maps in accordance with the coil temperature, there are such advantageous effects that part of the internal loss that the rotating electrical machine 900 can allow can be effectively utilized and breakage of the rotating electrical machine 900 can be prevented.

Incidentally, in a case where the configuration in FIG. 24 has been used, map switching for the Fail prediction signal is performed so as to switch from the standard current map 221*a* to the loss increase current map 221*e* that is the largest in loss similarly to the case using FIG. 19.

Second Embodiment

Figure 26:
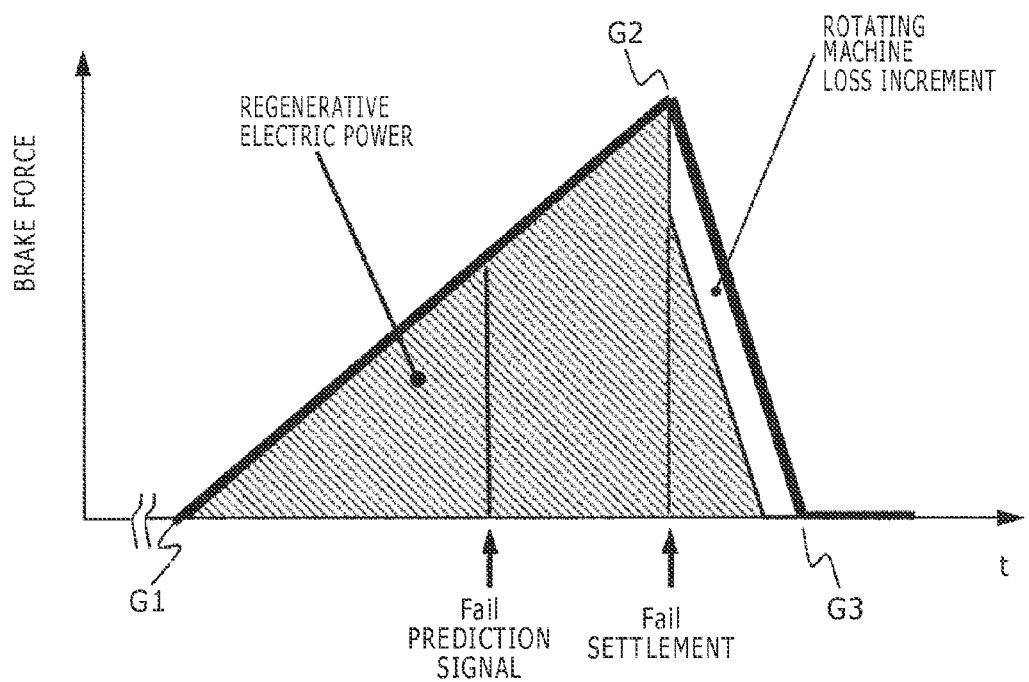
FIG. 26 is a diagram for describing a second embodiment.

In the abovementioned first embodiment, the control for increasing the internal loss of the rotating electrical machine 900 and reducing the regenerative electric power is started by receiving the Fail prediction signal so as to prepare for charging in the section G2 to 03 until the regenerative brake is suspended. In a second embodiment, as shown in FIG. 26, control for increasing the internal loss of the rotating electrical machine 900 and reducing the regenerative electric power is started when the Fail signal has been received. Since the charging amount of the battery 300 up to suspension of the regenerative brake can be reduced even by such control, although the effect is little in comparison with the abovementioned embodiment, there can be obtained the same battery protecting effect.

Summing-up of the abovementioned embodiments is as follows.

First, the electric vehicle system of the present embodiment is loaded on the electric vehicle having the rotating electrical machine that selectively enables the motor operation with the battery power and the electric power generation operation with the vehicle traveling energy and the regeneration cooperative brake control device that performs the regeneration cooperative brake control for apportioning the driver requested braking force to the frictional brake force and the regenerative brake force reduces the regenerative brake force and increases the frictional brake force so as to hold the braking force to the aforementioned driver requested braking force and suspends the regeneration cooperative brake control when the aforementioned battery becomes unchargeable during operation of the regeneration cooperative brake, and is provided with the battery monitoring unit that monitors the state of the battery loaded on the electric vehicle and the rotating electrical machine control unit that controls the rotating electrical machine of the electric vehicle.

(1) Upon detecting that the battery state is the unchargeable state during control of the regeneration cooperative brake, the battery control unit 310 that serves as the batty monitoring unit diagnoses whether the battery 300 is chargeable, and upon deciding that it is unchargeable from the result of diagnosis, outputs the Fail signal. Upon receiving the Fail signal during control of the regeneration cooperative brake, the rotating electrical machine control unit 210 executes the loss increase control for increasing the internal loss of the rotating electrical machine 900 and reducing the regenerative electric power by the regenerative brake, while holding the torque of the rotating electrical machine 900 at the regenerative torque corresponding to the regenerative brake force.

By performing such control, the charging amount of the battery up to suspension of the regenerative brake can be reduced and excessive charging of the battery can be reduced. As a result, it becomes possible to perform the regeneration operation stopping process as shown in FIG. 12 during control of the regeneration cooperative brake, and it becomes possible to promote improvement in vehicle traveling stability when stopping the regeneration operation during control of the regeneration cooperative brake.

(2) The battery control unit 310 outputs the Fail prediction signal simultaneously with start of the diagnosis. Then, upon receiving the Fail prediction signal during control of the regeneration cooperative brake, the rotating electrical machine control unit 210 executes the loss increase control.

Since the loss increase control for increasing the internal loss of the rotating electrical machine 900 and reducing the regenerative electric power to be returned to the battery 300 is started from upon receiving the Fail prediction signal, the margin is produced in the charging amount that the battery 300 can accept and further improvement in battery protection effect can be promoted.

(3) Further, upon deciding to be chargeable from the result of diagnosis, the battery control unit 310 outputs the Fail release signal. Then, upon receiving the Fail release signal after reception of the Fail prediction signal, the rotating electrical machine control unit 210 suspends the loss increase control, and upon receiving the Fail signal after reception of the Fail prediction signal, continues the loss increase control. Since the loss increase control is suspended in a case where the Fail release signal has been received, saving of the energy consumption can be effectively performed. In addition, battery protection can be more surely performed by continuing the abovementioned loss increase control even after the Fail signal has been received so as to reduce the regenerative electric power to be returned to the battery 300.

(4) Further, the temperature sensor 930 that detects the temperature of the stator coils (900U to 900W) of the rotating electrical machine 900 is provided on the electric motor car 1 so as to adjust the internal loss amount of the rotating electrical machine in the loss increase control in accordance with the detected temperature such that in a case where the temperature detected by the temperature sensor 930 is low, the internal loss amount becomes large, and in a case where the detected temperature is high, the internal loss amount becomes small. Therefore, excessive rising of the coil temperature of the rotating electrical machine 900 can be prevented and protection of the rotating electrical machine 900 can be promoted in addition to protection of the battery 300.

Adjustment of the internal loss amount according to the coil temperature in this way can be executed in any section without being limited to the section of G2 to G3 in FIG. 23 as long as it is done in the loss increase control.

(5) In a case where the temperature of the stator coils (900U to 900W) is not more than the temperature threshold value Tth1 that has been set lower than the predetermined upper limit temperature Tth2, for example, as shown in FIG. 23, the loss increase control is executed by using the maximum loss current map 221e that is the largest in internal loss in the plurality of current maps, and when the coil temperature exceeds the temperature threshold value Tth1, the loss increase control is executed by using the current map that is smaller in internal loss than the maximum loss current map 221e. Incidentally, although in FIG. 23, a case where there are two threshold values of the temperature has been described by way of example in FIG. 23, it may be also configured such that three or more threshold values are prepared so as to switch the current maps for each of them.

(6) Further, in a case where the coil temperature has reached the predetermined upper limit temperature Tth2, the loss increase control may be suspended by switching the current map to the minimum loss current map (the standard current map 221a). By performing such control, coil heat generation is minimized and it becomes possible to prevent the coil temperature from greatly exceeding the predetermined upper limit temperature Tth2.

(7) In addition, when the vehicle speed of the electric motor car 1 is low, the regenerative electric power of the rotating electrical machine 900 in the regeneration cooperative brake is also low. Therefore, it is preferable to adjust the internal loss amount when executing the loss increase control in accordance with the rotational angle velocity such that in a case where de rotational angle velocity of the rotating electrical machine 900 is low, the internal loss amount becomes small and in a case where the rotational angle velocity is high, the internal loss amount becomes large. It becomes possible to perform more effective loss increase control by taking the rotational angle velocity of the rotating electrical machine 900 into consideration in this way.

(8) The rotating electrical machine control unit 210 may be provided with the plurality of current maps 221a to 221g each indicating the relation between the torque and the rotational angle velocity of the rotating electrical machine 900 and the supply current in accordance with the magnitude of the internal loss as shown in FIG. 24 so as to use the standard current map 221a that is the smallest in internal loss in the plurality of current maps 221a to 221g when not executing the loss increase control and to use any one of the other current maps 221e, 221f and 221g when executing the loss increase control. An increase in arithmetic operation load on the rotating electrical machine control unit 210 can be suppressed by preparing such current maps in advance.

The abovementioned respective embodiments may be used alone individually or by combining them, because the advantageous effects of the respective embodiments can be exhibited singly or synergistically. In addition, the present invention is not limited to the abovementioned embodiments as long as the features of the present invention are not lost.

LIST OF REFERENCE SIGNS

1: electric motor car, 100: vehicle controller, 100a: regenerative and frictional braking forces distribution arithmetic unit, 110: first CAN, 120: second CAN, 200: electric power converter, 201: inverter circuit, 210: rotating electrical machine control, unit, 220: current command arithmetic operation unit, 220a: current map, 221a: standard current map, 220c: battery diagnosis decision unit, 220d: current map selection unit, 221e, 221f, 221g: loss increase current map, 300: battery, 310: battery control unit, 500: regeneration cooperative brake equipment, 900: rotating electric machine, 920: rotation sensor, 930: temperature sensor.

The invention claimed is:

1. An electric vehicle drive system, comprising: a battery monitoring unit that is loaded on an electrically driven vehicle provided with a regeneration cooperative brake control device and monitors the state of a battery loaded on the electrically driven vehicle; and a rotating electrical machine control unit that controls a rotating electrical machine of the electrically driven vehicle, wherein the battery monitoring unit, upon detecting that the battery state is an unchargeable state during control of a regeneration cooperative brake, diagnoses whether the battery is chargeable, and upon deciding to be unchargeable from a result of diagnosis, outputs an unchargeable signal, the rotating electrical machine control unit, upon receiving the unchargeable signal during control of the regeneration cooperative brake, executes loss increase control for increasing an internal loss of the rotating electrical machine and reducing regenerative electric power by a regenerative brake, while maintaining torque of the rotating electrical machine at regenerative toque corresponding to force of the regenerative brake, the battery monitoring unit outputs a prediction signal simultaneously with start of the diagnosis, and the rotating electrical machine control unit, upon receiving the prediction signal during control of the regeneration cooperative brake, executes the loss increase control, wherein the battery monitoring unit, upon deciding to be chargeable from the result of diagnosis, outputs a prediction release signal, and the rotating electrical machine control unit, upon receiving the prediction release signal after reception of the prediction signal, suspends the loss increase control, and upon receiving the unchargeable signal after reception of the prediction signal, continues the loss increase control.

2. The electric vehicle drive system according to claim 1, wherein the electrically driven vehicle is provided with a temperature sensor that detects a temperature of a stator coil of the rotating electrical machine, and the rotating electrical machine control unit adjusts an internal loss amount of the rotating electrical machine in the loss increase control in accordance with the detected temperature such that the internal loss amount becomes large in a case where a detected temperature by the temperature sensor is low and the internal loss amount becomes small in a case where the detected temperature is high.

3. The electric vehicle drive system according to claim 2, wherein the rotating electrical machine control unit, in a case where the temperature of the stator coil is not more than a temperature threshold value that has been set lower than a predetermined upper limit temperature, executes the loss increase control such that the internal loss amount of the rotating electrical machine amounts to a first internal loss amount, and when the temperature of the stator coil exceeds the temperature threshold value, executes the loss increase control such that the internal loss amount of the rotating electrical machine amounts to a second internal loss amount that is smaller than the first internal loss amount.

4. The electric vehicle drive system according to claim 3, wherein the rotating electrical machine control unit suspends the loss increase control in a case where the temperature of the stator coil has reached the predetermined upper limit temperature.

5. The electric vehicle drive system according to claim 1, wherein the rotating electrical machine control unit adjusts the internal loss amount of the rotating electrical machine in the loss increase control in accordance with the rotating angle velocity such that the internal loss amount becomes small in a case where the rotating angle velocity of the rotating electrical machine is small and the internal loss amount becomes large in a case of where the rotating angle velocity is large.

6. An electric vehicle drive system, comprising: a battery monitoring unit that is loaded on an electrically driven vehicle provided with a regeneration cooperative brake control device and monitors the state of a battery loaded on the electrically driven vehicle; and a rotating electrical machine control unit that controls a rotating electrical machine of the electrically driven vehicle, wherein the battery monitoring unit, upon detecting that the battery state is an unchargeable state during control of a regeneration cooperative brake, diagnoses whether the battery is chargeable, and upon deciding to be unchargeable from a result of diagnosis, outputs an unchargeable signal, the rotating electrical machine control unit, upon receiving the unchargeable signal during control of the regeneration cooperative brake, executes loss increase control for increasing an internal loss of the rotating electrical machine and reducing regenerative electric power by a regenerative brake, while maintaining torque of the rotating electrical machine at regenerative toque corresponding to force of the regenerative brake, the battery monitoring unit outputs a prediction signal simultaneously with start of the diagnosis, and the rotating electrical machine control unit, upon receiving the prediction signal during control of the regeneration cooperative brake, executes the loss increase control, wherein the rotating electrical machine control unit: is provided with a plurality of current maps each indicating a relation between the torque and the rotating angle velocity of the rotating electrical machine and a supply current in accordance with the magnitude of the internal losses;

uses a minimum internal loss current map that is the smallest in internal loss in the plurality of current maps when not executing the loss increase control; and uses any one of the other current maps except the minimum internal loss map when executing the loss increase control.

* * * * *